(12) United States Patent
Kim et al.

(10) Patent No.: US 11,599,275 B2
(45) Date of Patent: Mar. 7, 2023

(54) MEMORY CONTROLLER FOR CONTROLLING POWER LOSS RECOVERY AND METHOD OF OPERATING THE SAME

(71) Applicant: SK hynix Inc., Gyeonggi-do (KR)

(72) Inventors: Jin Pyo Kim, Gyeonggi-do (KR); Sang Min Kim, Gyeonggi-do (KR); Woo Young Yang, Gyeonggi-do (KR); Jun Six Jeong, Gyeonggi-do (KR); Seung Hun Ji, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/336,966

(22) Filed: Jun. 2, 2021

(65) Prior Publication Data
US 2022/0171542 A1 Jun. 2, 2022

(30) Foreign Application Priority Data
Dec. 2, 2020 (KR) .......................... 10-2020-0166871

(51) Int. Cl.
*G06F 3/06* (2006.01)
(52) U.S. Cl.
CPC .......... *G06F 3/0619* (2013.01); *G06F 3/0656* (2013.01); *G06F 3/0679* (2013.01)
(58) Field of Classification Search
CPC ..... G06F 3/0619; G06F 3/0656; G06F 3/0679
See application file for complete search history.

(56) References Cited

U.S. PATENT DOCUMENTS

| 2006/0015683 | A1* | 1/2006 | Ashmore | G06F 1/3268 |
| | | | | 711/135 |
| 2009/0235038 | A1* | 9/2009 | Sartore | G06F 12/0638 |
| | | | | 711/E12.103 |
| 2017/0123946 | A1* | 5/2017 | Wu | G06F 11/2094 |
| 2018/0024830 | A1* | 1/2018 | Kannan | G06F 3/0607 |
| | | | | 711/104 |
| 2020/0301780 | A1* | 9/2020 | Kim | G06F 11/108 |
| 2020/0327055 | A1* | 10/2020 | Mao | G06F 12/0804 |

FOREIGN PATENT DOCUMENTS

| KR | 10-2018-0023190 A | 3/2018 |
| KR | 10-2020-0058867 A | 5/2020 |

* cited by examiner

*Primary Examiner* — Mark A Giardino, Jr.
(74) *Attorney, Agent, or Firm* — IP & T Group LLP

(57) ABSTRACT

Provided herein may be a memory controller and a method of operating the same. The memory controller may include a SPO detector configured to output a detection signal when a SPO is detected, a memory buffer configured to store host data, and a power loss controller configured to, based on the detection signal, receive dump data corresponding to the host data, store the dump data and a dump age corresponding to the dump data, and output the dump data and the dump age to a memory device, wherein the dump age indicates a number of times that different items of host data have been dumped from the memory buffer to the power loss controller, and the power loss controller is configured to control a recovery operation corresponding to the SPO based on the dump age being received from the memory device.

20 Claims, 13 Drawing Sheets

MEMORY CONTROLLER FOR CONTROLLING POWER LOSS RECOVERY AND METHOD OF OPERATING THE SAME

CROSS-REFERENCE TO RELATED APPLICATION

The present application claims priority under 35 U.S.C. § 119(a) to Korean patent application number 10-2020-0166871, filed on Dec. 2, 2020, with the Korean Intellectual Property Office, and which is incorporated herein by reference in its entirety.

BACKGROUND

Field of Invention

One or more embodiments described herein relate to a memory controller and a method of operating a memory controller.

Description of Related Art

A storage device stores data under control of a host device such as a computer, smartphone, or smartpad. Some storage devices (e.g., hard disk drives) store data in a magnetic disk, while others (e.g., solid state drives and memory cards) store data in a semiconductor memory. Structurally, a storage device may include a controller which controls storage of data in a memory device. The memory device may be a volatile memory device or a nonvolatile memory device. Representative examples of a nonvolatile memory device include a read only memory (ROM), programmable ROM (PROM), electrically programmable ROM (EPROM), electrically erasable programmable ROM (EEPROM), flash memory, phase-change random access memory (PRAM), magnetic RAM (MRAM), resistive RAM (RRAM), and a ferroelectric RAM (FRAM).

SUMMARY

One or more embodiments described herein are directed to a memory controller that performs a recovery operation in the event of a sudden power-off.

These or other embodiments may perform the recovery operation based on a comparison between indices of a recovery area and a meta-area.

These or other embodiments are directed to a method of operating a memory controller.

An embodiment of the present disclosure may provide for a memory controller for controlling a memory device. The memory controller may include a sudden power-off (SPO) detector configured to output a detection signal when a sudden power-off is detected, a memory buffer configured to store host data output from a host, and a power loss controller configured to, based on the detection signal, receive dump data corresponding to the host data from the memory buffer, store the dump data and a dump age corresponding to the dump data, and output the dump data and the dump age to a memory device. The dump age may indicate a number of times that different items of host data have been dumped from the memory buffer to the power loss controller. The power loss controller may be configured to receive the dump data and the dump age from the memory device during a recovery operation corresponding to the sudden power-off, and control the recovery operation based on the dump age.

An embodiment of the present disclosure may provide an apparatus. The apparatus may include a memory device, a memory controller configured to control the memory device to, store dump data and a dump age in a recovery area of the memory device based on detection of a sudden power-off, the dump data corresponding to data temporarily stored in a memory buffer of the memory controller, and perform a recovery operation based on the dump age stored in the memory device. The dump age may indicate a number of times that different items of host data corresponding to the dump data have been dumped.

An embodiment of the present disclosure may provide for a method of operating a memory controller. The method may include storing host data, from a host, in a memory buffer, when a sudden power-off is detected, storing dump data and a dump age corresponding to the dump data, the dump data corresponding to the host data stored in the memory buffer, determining whether the host data is to be dumped to a memory device, outputting the dump data and the dump age to the memory device, receiving the dump data and the dump age from the memory device, and performing a recovery operation corresponding to the sudden power-off based on the dump age. The dump age may indicate a number of times that different items of host data have been dumped as the dump data

DETAILED DESCRIPTION

Specific structural or functional descriptions in the embodiments of the present disclosure introduced in this specification or application are only for description of the embodiments of the present disclosure. The descriptions should not be construed as being limited to the embodiments described in the specification or application.

Various embodiments of the present disclosure will now be described more fully hereinafter with reference to the accompanying drawings, in which preferred embodiments of the present disclosure are illustrated, so that those of ordinary skill in the art can easily carry out the technical idea of the present disclosure.

Figure 1:
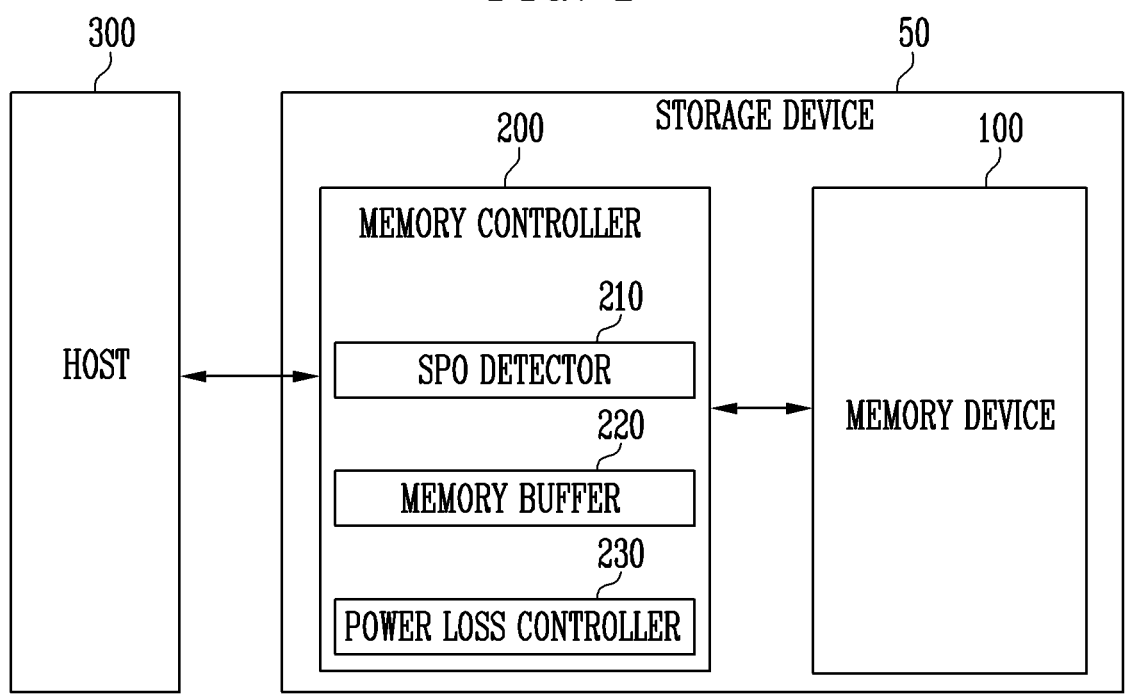
FIG. 1 illustrates an embodiment of a storage device.

FIG. 1 illustrates an embodiment of a storage device 50, which may include memory devices 100 and a memory controller 200. The storage device 50 may store data under the control of a host 300. Examples of the host 300 include a mobile phone, a smartphone, an MP3 player, a laptop computer, a desktop computer, a game console, a television (TV), a tablet PC, and an in-vehicle infotainment system.

The storage device 50 may be any one of various types of storage devices depending, for example, on the communication scheme of an interface of the host 300. Examples of the storage device 50 include a solid state disk (SSD), a multimedia card such as an MMC, an embedded MMC (eMMC), a reduced size MMC (RS-MMC), or a micro-MMC, a secure digital card such as an SD, a mini-SD, or a micro-SD, a universal serial bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick.

The storage device 50 may be any one of various types of packages. Examples of the packages include package on package (POP), system in package (SIP), system on chip (SOC), multi-chip package (MCP), chip on board (COB), wafer-level fabricated package (WFP), and wafer-level stack package (WSP).

The memory device 100 may store data in response to control of the memory controller 200. The memory device 100 may include a memory cell array including a plurality of memory cells which store data. The memory cell array may include a plurality of memory blocks, and each memory block may include a plurality of memory cells which may constitute a plurality of pages. In an embodiment, each page may be a unit by which data is stored in the memory device 100 or by which data stored in the memory device 100 is read. A memory block may be a unit by which data is erased.

The memory device 100 may include, for example, a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change random access memory (PRAM), a magnetic RAM (MRAM), a ferroelectric RAM (FRAM), or a spin transfer torque RAM (STT-RAM). For convenience of description, the memory device 100 may be assumed to be a NAND flash memory.

The memory device 100 may have a two-dimensional (2D) array structure or a three-dimensional (3D) array structure. Hereinafter, although a 3D array structure is described as an embodiment, the present disclosure is not limited to the 3D array structure. The present disclosure may also be applied, not only to a flash memory device in which a charge storage layer is formed of a conductive floating gate (FG), but also to a charge trap flash (CTF) memory device in which a charge storage layer is formed of an insulating layer.

In an embodiment, the memory device 100 may be operated in a single-level cell (SLC) manner in which one data bit is stored in one memory cell. In one embodiment, the memory device 100 may be operated in a manner in which at least two data bits are stored in one memory cell. For example, the memory device 100 may be operated in a multi-level cell (MLC) manner in which two data bits are stored in one memory cell, a triple-level cell (TLC) manner in which three data bits are stored in one memory cell, or a quadruple-level cell (QLC) manner in which four data bits are stored in one memory cell.

The memory device 100 may receive commands and addresses from the memory controller 200, and may access areas of the memory cell array selected by the addresses. For example, the memory device 100 may perform an operation corresponding to a command on an area selected by an address. In one embodiment, the memory device 100 may perform a write operation (e.g., program operation), a read operation or an erase operation in response to received commands. When a program command is received, the memory device 100 may program data to an area selected by an address. When a read command is received, the memory device 100 may read data from an area selected by an address. When an erase command is received, the memory device 100 may erase data stored in an area selected by an address.

The memory controller 200 may control the overall operation of the storage device 50. When a supply voltage is applied to storage device 50, memory controller 200 may execute instructions (e.g., firmware). When memory device 100 is a flash memory device 100, the memory controller 200 may run firmware such as a Flash Translation Layer (FTL) for controlling communication between the host 300 and the memory device 100.

In an embodiment, the memory controller 200 may include firmware that receives data and a logical block address (LBA) from the host 300, and translates the logical block address (LBA) to a physical block address (PBA) indicating the address of memory cells in the memory device 100 and in which data is to be stored. Further, the memory controller 200 may store a logical-physical address mapping table which configures mapping relationships between logical block addresses (LBA) and physical block addresses (PBA), in a buffer memory.

The memory controller 200 may control the memory device 100 so that a program operation, a read operation or an erase operation is performed in response to a request from the host 300. For example, when a program request is received from the host 300, the memory controller 200 may convert the program request to a program command and may provide the program command, a physical block address (PBA), and data to the memory device 100. When a read request together with a logical block address is received from the host 300, the memory controller 200 may convert the read request to a read command, select a physical block address corresponding to the logical block address, and thereafter provide the read command and the physical block address (PBA) to the memory device 100. When an erase request together with a logical block address is received from the host 300, the memory controller 200 may convert the erase request to an erase command, select a physical block address corresponding to the logical block address, and thereafter provide the erase command and the physical block address (PBA) to the memory device 100.

In an embodiment, the memory controller 200 may autonomously generate a program command, an address, and data without receiving a request from the host 300, and may transmit them to the memory device 100. For example, the memory controller 200 may provide commands, addresses, and data to the memory device 100 to perform background operations, such as a program operation for wear leveling and a program operation for garbage collection.

In an embodiment, the memory controller 200 may include a sudden power-off detector 210. The sudden power-off (SPO) detector 210 may detect a sudden power-off (SPO) in which the power of the memory device 100 is instantaneously turned off (or otherwise interrupted) during an operation. When power is turned on again after occurrence of the sudden power-off (SPO), an SPO recovery operation may be performed. When a sudden power-off (SPO) occurs during a program operation of the memory device 100, data may be programmed again to a newly assigned memory block (other than the memory block in which the SPO has occurred) through the SPO recovery operation.

The memory controller 200 may include, for example, a memory buffer 220 which, for example, may be a dynamic random access memory (DRAM) and/or a static random access memory (SRAM). The memory buffer 220 may temporarily store data received from the host 300 before the received data is programmed to the memory device 100. The data stored in the memory buffer 220 may be output and programmed to the memory device 100.

In the case where a sudden power-off (SPO) occurs before the data stored in the memory buffer 220 is programmed to the memory device 100, the data stored in the memory buffer 220 may be output to the memory device 100 before power is turned off, and the data output to the memory device 100 may be transmitted again to the memory buffer 220 when an SPO recovery operation is performed.

In an embodiment, the memory controller 200 may include a power loss controller 230. The power loss controller 230 may stably supply power in the event of a sudden power-off (SPO) and may prevent the loss of data attributable to the occurrence of the SPO.

In one embodiment, the power loss controller 230 may prevent power from being instantaneously turned off by supplying assistant power (auxiliary power) in the event of a sudden power-off (SPO), e.g., the power loss controller 230 may turn off power gradually or at a predetermined rate or time delay. Further, the power loss controller 230 may receive the data stored in the memory buffer 220 and store the received data in the memory device 100 in the event of a sudden power-off (SPO).

In an embodiment, the storage device 50 may include a buffer memory, and the memory controller 200 may control data exchange between the host 300 and the buffer memory. In one embodiment, the memory controller 200 may temporarily store system data for controlling the memory device 100 in the buffer memory. For example, the memory controller 200 may temporarily store data from the host 300 in the buffer memory and then may transmit the data, temporarily stored in the buffer memory, to the memory device 100.

In various embodiments, the buffer memory may be used as a working memory or a cache memory for the memory controller 200. The buffer memory may store codes or commands that are executed by the memory controller 200. In one embodiment, the buffer memory may store data that is processed by the memory controller 200. The buffer memory may be implemented, for example, as a DRAM, e.g., a double data rate SDRAM (DDR SDRAM), a double data rate fourth generation (DDR4) SDRAM, a low power double data rate fourth generation (LPDDR4) SDRAM, a graphics double data rate (GDDR) SDRAM, a low power DDR (LPDDR) SDRAM, or a Rambus DRAM (RDRAM), or as a static RAM (SRAM).

In various embodiments, the buffer memory may be outside and coupled to the storage device 50. In this case, one or more external volatile memory devices may function as the buffer memory.

In an embodiment, the memory controller 200 may control at least two memory devices. In this case, the memory controller 200 may control the memory devices depending on an interleaving scheme to improve operating performance.

The host 300 may communicate with the storage device 50 using at least one of various communication methods. Examples include Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe-E), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

Figure 2:
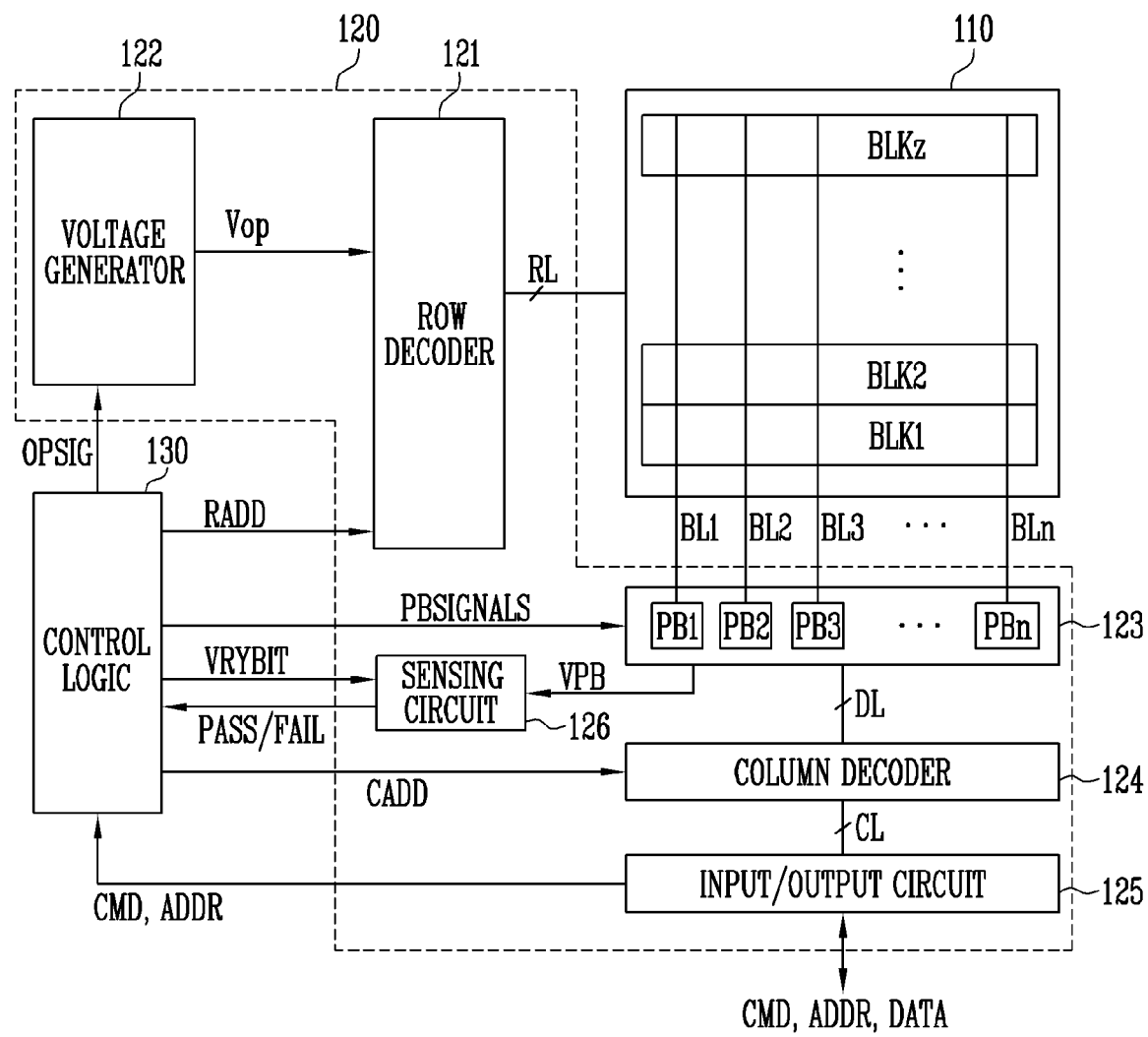
FIG. 2 illustrates an embodiment of a memory device.

FIG. 2 illustrates an embodiment of the memory device 100, which may include a memory cell array 110, a peripheral circuit 120, and a control logic 130.

Referring to FIG. 2, the memory cell array 110 includes a plurality of memory blocks BLK1 to BLKz coupled to a row decoder 121 through row lines RL. The row lines RL may include at least one source select line, a plurality of word lines, and at least one drain select line. Each of the memory blocks BLK1 to BLKz may be coupled to a page buffer group 123 through bit lines BL1 to BLn. Each of the memory blocks BLK1 to BLKz may include a plurality of memory cells. In an embodiment, the memory cells may be nonvolatile memory cells. Memory cells coupled to the same word line may correspond to a single page. Therefore, a single memory block may include a plurality of pages.

Each of the memory cells in the memory cell array 110 may be implemented as a single-level cell (SLC) capable of storing one data bit, a multi-level cell (MLC) capable of storing two data bits, a triple-level cell (TLC) capable of storing three data bits, or a quadruple-level cell (QLC) capable of storing four data bits.

The peripheral circuit 120 may perform a program operation, a read operation, and/or an erase operation on a selected area of the memory cell array 110 under the control of the control logic 130. The peripheral circuit 120 may drive the memory cell array 110, for example, by applying various operating voltages to the row lines RL and the bit lines BL1 to BLn, and/or may discharge the applied voltages under control of the control logic 130.

The peripheral circuit 120 may include the row decoder 121, a voltage generator 122, the page buffer group 123, a column decoder 124, an input/output circuit 125, and a sensing circuit 126. The row decoder 121 is coupled to the memory cell array 110 through the row lines RL, and the row lines RL may include at least one source select line, a plurality of word lines, and at least one drain select line. In an embodiment, the word lines may include normal word lines and dummy word lines. In an embodiment, the row lines RL may further include a pipe select line.

The row decoder 121 may decode a row address RADD received from the control logic 130 and may select at least one of the memory blocks BLK1 to BLKz according to the decoded address. Further, the row decoder 121 may select at least one word line WL of the selected memory block, so that voltages generated by the voltage generator 122 are applied to the at least one word line WL according to the decoded address.

For example, during a program operation, the row decoder 121 may apply a program voltage to a selected word line and may apply a program pass voltage (e.g., having a level lower than that of the program voltage) to unselected word lines. During a program verify operation, the row decoder 121 may apply a verify voltage to a selected word line and apply a verify pass voltage (e.g., higher than the verify voltage) to unselected word lines. During a read operation, the row decoder 121 may apply a read voltage to a selected word line and may apply a read pass voltage (e.g., higher than the read voltage) to unselected word lines.

In an embodiment, the erase operation of the memory device 100 is performed on a memory block basis. During an erase operation, the row decoder 121 may select one memory block according to the decoded address. During the erase operation, the row decoder 121 may apply a ground voltage to word lines coupled to the selected memory block.

The voltage generator 122 may be operated under control of the control logic 130. The voltage generator 122 may generate a plurality of voltages based on an external supply voltage provided to the memory device 100. For example, the voltage generator 122 may generate various operating voltages Vop to be used for program, read, and/or erase operations in response to an operation signal OPSIG. For example, the voltage generator 122 may generate a program voltage, a verify voltage, a pass voltages, a read voltage, an erase voltage and/or other voltages under the control of the control logic 130.

In an embodiment, the voltage generator 122 may generate an internal supply voltage by regulating the external supply voltage. The internal supply voltage generated by the voltage generator 122 may be used as an operating voltage for the memory device 100.

In an embodiment, the voltage generator 122 may generate a plurality of voltages based on the external supply voltage or the internal supply voltage. For example, the voltage generator 122 may include a plurality of pumping capacitors for receiving the internal supply voltage and may generate a plurality of voltages by selectively enabling the plurality of pumping capacitors under the control of the control logic 130. The generated voltages may be supplied to the memory cell array 110 by the row decoder 121.

The page buffer group 123 includes first to nth page buffers PB1 to PBn coupled to the memory cell array 110 through the first to nth bit lines BL1 to BLn. The first to nth page buffers PB1 to PBn may be operated under control of the control logic 130. For example, the first to nth page buffers PB1 to PBn may be operated in response to page buffer control signals PBSIGNALS. Also, for example, the first to nth page buffers PB1 to PBn may temporarily store data received through the first to nth bit lines BL1 to BLn or may sense voltages or currents of the bit lines BL1 to BLn during a read or verify operation.

During a program operation, for example, when the program voltage is applied to the selected word line, the first to nth page buffers PB1 to PBn may transfer the data DATA, received through the input/output circuit 125, to selected memory cells through the first to nth bit lines BL1 to BLn. The memory cells in the selected page are programmed based on the received data DATA.

During a program verify operation, for example, the first to nth page buffers PB1 to PBn may read page data by sensing the voltages or currents received through the first to nth bit lines BL1 to BLn from the selected memory cells.

During a read operation, for example, the first to nth page buffers PB1 to PBn may read data DATA from the memory cells in the selected page through the first to nth bit lines BL1 to BLn and may output the read data DATA to the input/output circuit 125 under control of column decoder 124.

During an erase operation, for example, the first to nth page buffers PB1 to PBn may allow the first to nth bit lines BL1 to BLn to float or may apply the erase voltage to the first to nth bit lines BL1 to BLn.

The column decoder 124 may transfer data between the input/output circuit 125 and the page buffer group 123 in response to a column address CADD. For example, the column decoder 124 may exchange data with the first to nth page buffers PB1 to PBn through data lines DL or may exchange data with the input/output circuit 125 through column lines CL.

The input/output circuit 125 may transfer a command CMD and an address ADDR to the control logic 130 or may exchange data DATA with the column decoder 124. The command CMD and address ADDR may be received from the memory controller (e.g., 200 of FIG. 1) described with reference to FIG. 1.

During a read operation or a verify operation, the sensing circuit 126 may generate a reference current in response to an enable bit VRYBIT, and may compare a sensing voltage VPB received from the page buffer group 123 with a reference voltage generated by the reference current. The sensing circuit 126 may then output a pass signal PASS or a fail signal FAIL based on a result of the comparison.

The control logic 130 may control the peripheral circuit 120 by outputting operation signals OPSIG, row addresses RADD, page buffer control signals PBSIGNALS, and one or more enable bits VRYBIT in response to corresponding commands CMD and addresses ADDR. For example, the control logic 130 may control a read operation on a selected memory block in response to a sub-block read command and an address. The control logic 130 may control an erase operation on a selected sub-block in a selected memory block in response to a sub-block erase command and an address. In addition, the control logic 130 may determine whether a verify operation has passed or failed in response to the pass or fail signal PASS or FAIL.

Figure 3:
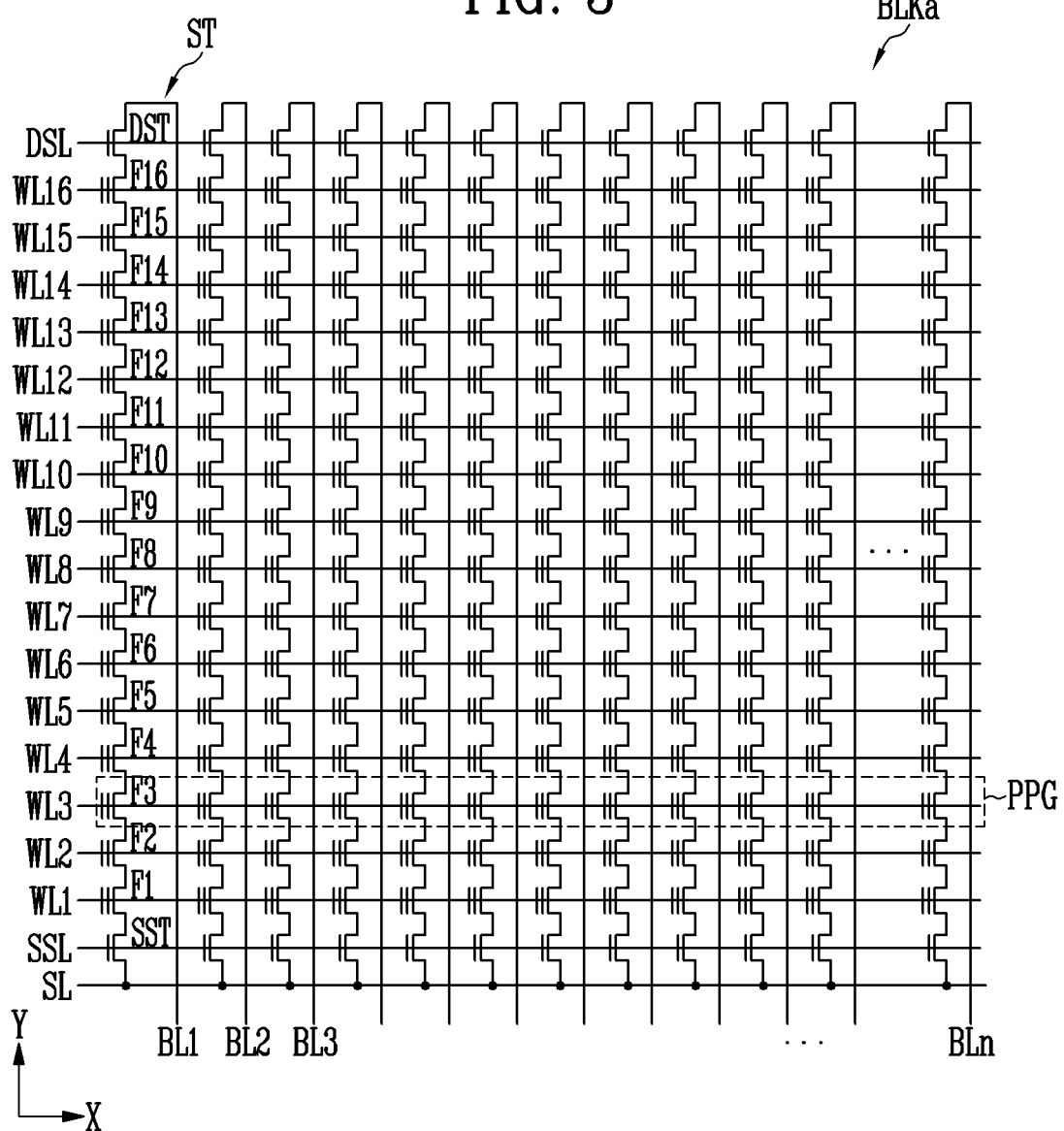
FIG. 3 illustrates an embodiment of a memory cell array.

FIG. 3 is a diagram illustrating an embodiment of the memory cell array of FIG. 2. Referring to FIGS. 2 and 3, FIG. 3 illustrates an embodiment of a circuit diagram of memory block BLKa, which may be representative of memory blocks BLK1 to BLKz in the memory cell array 110 of FIG. 2.

The memory block BLKa may be coupled to a first select line, word lines, and a second select line arranged in parallel to each other. For example, the word lines may be coupled in parallel to each other between the first and second select lines. In one embodiment, the first select line may be a source select line SSL and the second select line may be a drain select line DSL.

For example, the memory block BLKa may include a plurality of strings coupled between bit lines BL1 to BLn and a source line SL. The bit lines BL1 to BLn may be coupled to the strings, respectively, and the source line SL may be coupled in common to the strings. The strings may be equally configured, and in this case a string ST coupled to the first bit line BL1 will be described by way of example.

The string ST may include a source select transistor SST, a plurality of memory cells F1 to F16, and a drain select transistor DST which are coupled in series to each other between the source line SL and the first bit line BL1. A single string ST may include at least one source select transistor SST and at least one drain select transistor DST. More memory cells than memory cells F1 to F16 may be included in the string ST.

A source of the source select transistor SST may be coupled to the source line SL, and a drain of the drain select transistor DST may be coupled to the first bit line BL1. The memory cells F1 to F16 may be coupled in series between the source select transistor SST and the drain select transistor DST. Gates of the source select transistors in different strings ST may be coupled to the source select line SSL, gates of the drain select transistors in different strings ST may be coupled to the drain select line DSL, and gates of the memory cells F1 to F16 may be coupled to a plurality of word lines WL1 to WL16, respectively. In one embodiment, a group of memory cells coupled to the same word line, among the memory cells in different strings ST, may be referred to as a "physical page: PPG". Therefore, the memory block BLKa may include a number of physical pages PPG corresponding to the number of word lines WL1 to WL16.

One memory cell may store one bit of data. Such a cell may be designated a "single-level cell: SLC". One physical page PPG may store data corresponding to one logical page LPG. Data corresponding to one logical page LPG may include a number of data bits corresponding to the number of memory cells in one physical page PPG. In one embodiment, one memory cell may store two or more bits of data. Such a cell may be designated as a "multi-level cell: MLC". Here, one physical page PPG may store data corresponding to two or more logical pages LPG.

A memory cell, in which two or more bits of data are stored in one memory cell, may be referred to as a multi-level cell (MLC). In some cases, a multi-level cell (MLC) may refer to a memory cell in which two bits of data are stored. A memory cell which stores three bits of data may be referred to as a triple-level cell (TLC). A memory cell which stores four or more bits of data may be referred to as a quadruple-level cell (QLC). In addition, one or more embodiments may apply to a memory cell scheme in which multiple bits of data are stored. In one embodiment, memory device 100 may have memory cells storing two or more bits of data.

In an embodiment, each of the memory blocks may have a three-dimensional (3D) structure. Each of the memory blocks may include a plurality of memory cells stacked on a substrate. The plurality of memory cells are arranged in +X, +Y, and +Z directions.

Figure 4:
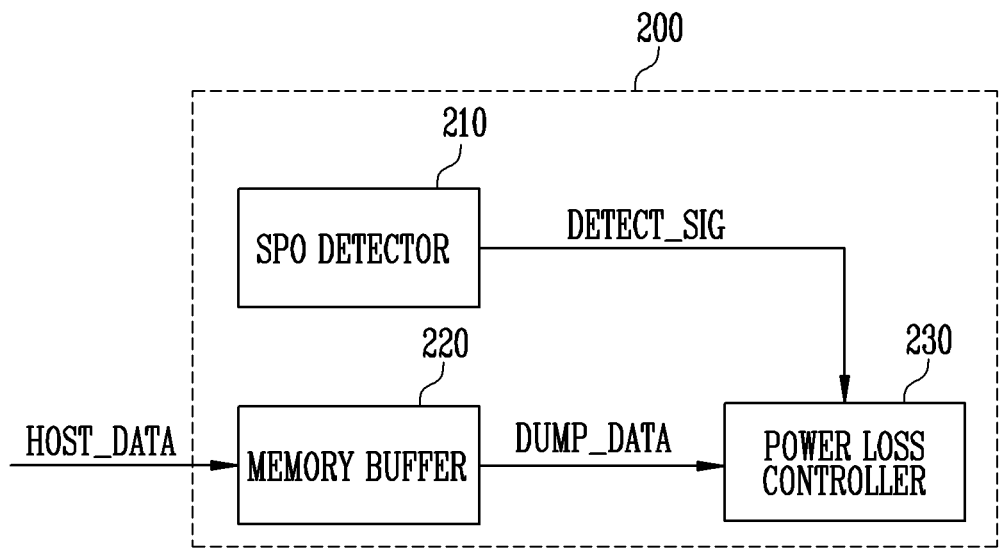
FIG. 4 illustrates an embodiment of operation of a memory controller.

FIG. 4 is a diagram illustrating an embodiment of the operation of memory controller 200 in the event of a sudden power-off.

Referring to FIG. 4, the memory controller 200 may include a sudden power-off detector 210, a memory buffer 220, and a power loss controller 230. In an embodiment, the sudden power-off detector 210 may detect a sudden power-off (SPO). In one embodiment, the sudden power-off (SPO) may be a phenomenon in which power is instantaneously turned off during operation of the memory device (e.g., 100 of FIG. 1). When power is turned on again after the occurrence of a sudden power-off (SPO), an SPO recovery operation may be performed to resume performance of an operation that was suspended due to the sudden power-off (SPO).

In an embodiment, when the sudden power-off detector 210 detects an SPO, the sudden power-off detector 210 may output a detection signal DETECT_SIG to the power loss controller 230. In an embodiment, the memory buffer 220 may receive host data HOST_DATA from the host (e.g., 300 of FIG. 1). The host data HOST_DATA may be data to be programmed to the memory device (e.g., 100 of FIG. 1).

After the host data HOST_DATA received from the host (e.g., 300 of FIG. 1) is temporarily stored in the memory buffer 220, the memory buffer 220 may output the host data HOST_DATA to the memory device (e.g., 100 of FIG. 1). When the host data HOST_DATA is output to the memory device (e.g., 100 of FIG. 1), the host data HOST_DATA may be programmed to the memory device (e.g., 100 of FIG. 1).

However, before the host data HOST_DATA stored in the memory buffer 220 is programmed to the memory device (e.g., 100 of FIG. 1), a sudden power-off (SPO) may occur. Since the host data HOST_DATA is not yet programmed to the memory device (e.g., 100 of FIG. 1), the host data HOST_DATA may be lost due to the sudden power-off (SPO).

In an embodiment, in order to prevent loss of the host data HOST_DATA, power loss controller 230 may receive dump data DUMP_DATA from the memory buffer 220 based on the detection signal DETECT_SIG from the sudden power-off (SPO) detector 210.

For example, when the power loss controller 230 receives the detection signal DETECT_SIG from the sudden power-off detector 210, the host data HOST_DATA stored in the memory buffer 220 may be dumped to the power loss controller 230. The host data HOST_DATA stored in the memory buffer 220 may be provided, for example, as the dump data DUMP_DATA to the power loss controller 230.

Thereafter, before the power is turned off, the power loss controller 230 may output the dump data DUMP_DATA received from the memory buffer 220 to the memory device (e.g., 100 of FIG. 1), and the dump data DUMP_DATA may be stored in the memory device (e.g., 100 of FIG. 1), thus enabling the data to be retained without being lost. Thereafter, the dump data DUMP_DATA, stored in the memory device (e.g., 100 of FIG. 1), may be output again to the memory buffer 220 when a recovery operation corresponding to the sudden power-off (SPO) is performed.

However, when a sudden power-off (SPO) occurs in the state in which the auxiliary power supply of the power loss controller 230 is not sufficiently charged, the host data HOST_DATA stored in the memory buffer 220 may not be dumped to the power loss controller 230. If the host data HOST_DATA is not dumped to the power loss controller 230, the host data HOST_DATA may be lost without being programmed to the memory device (e.g., 100 of FIG. 1).

Figure 5:
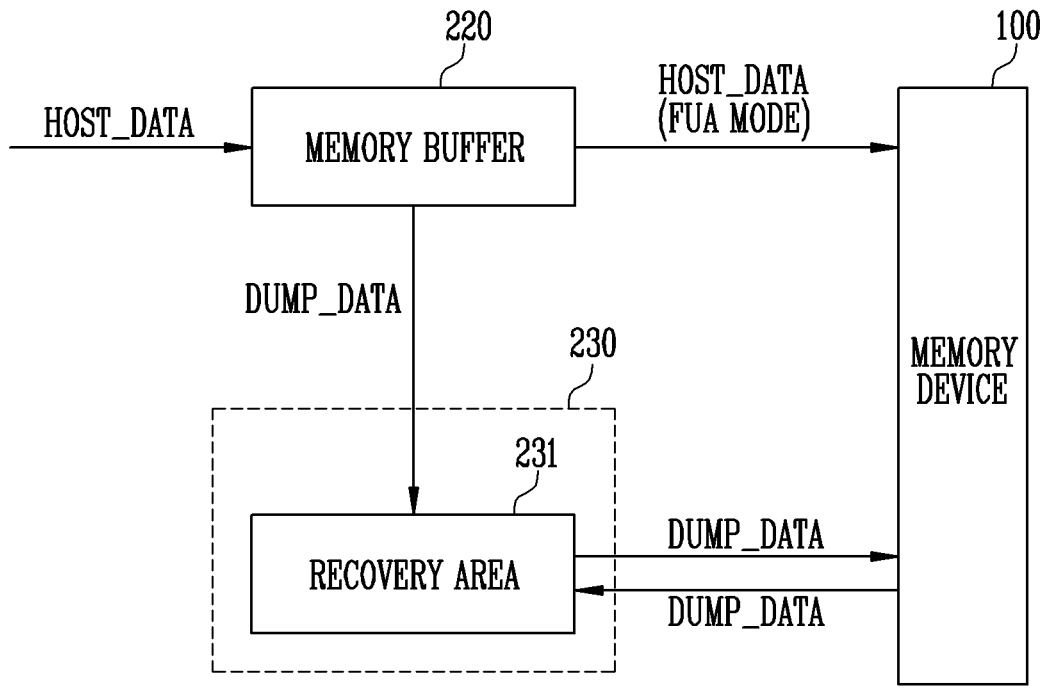
FIG. 5 illustrates an embodiment of operation of a memory controller.

FIG. 5 is a diagram illustrating an embodiment of the operation of memory controller 200 in the event of a sudden power-off.

Referring to FIGS. 4 and 5, the memory controller 200 may include a sudden power-off detector 210, a memory buffer 220, and a power loss controller 230, in the same manner as the memory controller 200 of FIG. 4. Furthermore, the power loss controller 230 may include a recovery area 231. The recovery area 231 may be an area in which data dumped from the memory buffer 220 is stored in the event of a sudden power-off (SPO).

In an embodiment, host data HOST_DATA output from the host (e.g., 300 of FIG. 1) may be stored in the memory buffer 220 and then may be output to the memory device 100. Here, the host data HOST_DATA may be data received from the host (e.g., 300 of FIG. 1) and that is to be programmed to the memory device 100.

In order to improve performance of the storage device (e.g., 50 of FIG. 1), when all of the host data HOST_DATA received from the host (e.g., 300 of FIG. 1) is stored in the memory buffer 220, a program completion response may be output to the host (e.g., 300 of FIG. 1), even before the host data HOST_DATA is programmed to the memory device 100.

In an embodiment, a sudden power-off (SPO) may occur during the operation of the memory device 100. When a sudden power-off (SPO) occurs, the memory device 100 may suspend operation thereof and thus data stored in the memory buffer 220 may be lost.

Therefore, in order to prevent the loss of the data stored in the memory buffer 220, the data stored in the memory buffer 220 may be output and programmed to the memory device 100. In one embodiment, the power loss controller 230 may supply assistant power to gradually turn off the power and may program the data, stored in the memory buffer 220, to the memory device 100 through the assistant power.

For example, after charging of an auxiliary power supply of the power loss controller 230 has been completed and a sudden power-off (SPO) occurs, assistant power may be supplied to the memory device 100 through the auxiliary power supply. Also, based on the assistant power supplied by the auxiliary power supply, the host data HOST_DATA stored in the memory buffer 220 may be output as dump data DUMP_DATA to the recovery area 231. The dump data DUMP_DATA stored in the recovery area 231 may then be dumped to and stored in the memory device 100.

When the dump data DUMP_DATA is stored in the recovery area 231, information indicative of a dump age may be stored together with the dump data DUMP_DATA. The dump age information may indicate the number of times that different items of host data have been dumped to the recovery area 231. For example, dump age may be a value increased by '1' whenever dump data DUMP_DATA is dumped to the recovery area 231. In one embodiment, the dump age may be a value obtained by cumulatively counting the number of times that the dump data DUMP_DATA is dumped to the recovery area 231, and the cumulative count may represent a dump count. The dump age may be sequentially increased by '1' from a default value, e.g., '0'.

For example, when the dump data DUMP_DATA is first dumped from the memory buffer 220 to the recovery area 231, the corresponding dump data DUMP_DATA may be stored in the recovery area 231 together with information indicating a dump age of '1', obtained by counting the number of times that the data is dumped to the recovery area 231. Thereafter, when the dump data DUMP_DATA is again dumped from the memory buffer 220 to the recovery area 231, the corresponding dump data DUMP_DATA may be stored in the recovery area 231, together with a dump age of '2' obtained by counting the number of times that the data is dumped to the recovery area 231.

The dump data DUMP_DATA and the dump age, which are stored in the recovery area 231, may be dumped to the memory device 100. Thereafter, in a recovery operation corresponding to the sudden power-off (SPO), the dump data DUMP_DATA and information indicative of the dump age (which were dumped to the memory device 100) may be output from the memory device 100 to the recovery area 231. When the SPO recovery operation is completed based on the dump data DUMP_DATA, the dump age may be stored in a meta-area, e.g., an area storing meta information indicative of the dump age.

Therefore, when a sudden power-off (SPO) occurs, the power loss controller 230 may be operated even when data is present only in the memory buffer 220, thus preventing loss of the data stored in the memory buffer 220 and guaranteeing programming of the data stored in the memory buffer 220. The data dumped to the memory device 100 may be output to the recovery area 231 during an SPO recovery operation (SPO RECOVERY), and the recovery operation may be performed based on the data output to the recovery area 231.

However, when charging of the auxiliary power supply of the power loss controller 230 is delayed or not yet completed and a sudden power-off (SPO) occurs, assistant power may not be supplied to the memory device 100 through the auxiliary power supply. When the power loss controller 230 is not operated under these circumstances, the host data HOST_DATA stored in the memory buffer 220 may not be output as dump data DUMP_DATA to the recovery area 231.

In this case, the host data HOST_DATA stored in the memory buffer 220 may be programmed in a force unit access mode (FUA MODE). For example, the program operation may be completed in such a way that, after the host data HOST_DATA stored in the memory buffer 220 is programmed to the memory device 100 and map data is updated, a completion response is output to the host (e.g., 300 of FIG. 1).

As a result, when charging of the auxiliary power supply of the power loss controller 230 is delayed or has not yet been completed, the host data HOST_DATA stored in the memory buffer 220 may be programmed in the FUA mode and then power may be turned off. This may prevent loss of the data. In an embodiment, when power is turned on again after occurrence of the sudden power-off (SPO), an SPO recovery operation may be performed.

However, when the host data HOST_DATA stored in the memory buffer 220 is programmed in the FUA mode and a sudden power-off (SPO) occurs, and then power is turned on again, it may not be possible to know whether the dump data DUMP_DATA stored in the recovery area 231 has been dumped and programmed to the memory device 100. For example, it may not be possible to determine whether power is turned off after the dump data DUMP_DATA stored in the recovery area 231 has been dumped to and stored in the memory device 100, or whether power is turned off without dumping the dump data DUMP_DATA stored in the recovery area 231 to the memory device 100.

When, in the event of an SPO, it is determined that the dump data DUMP_DATA stored in the recovery area 231 is dumped to and stored in the memory device 100, and an SPO recovery operation is not performed based on the dump data DUMP_DATA stored in the recovery area 231, host data HOST_DATA may be lost.

In contrast, when, in the event of an SPO, it is determined that the dump data DUMP_DATA stored in the recovery area 231 is not dumped to and stored in the memory device 100, and an SPO recovery operation is performed based on the dump data DUMP_DATA stored in the recovery area 231, host data HOST_DATA may be changed to previous data.

Therefore, in accordance with one or more embodiments, a method may be provided of retaining data even when charging of the auxiliary power supply of the power loss controller 230 is delayed and is not completed is presented.

Figure 6:
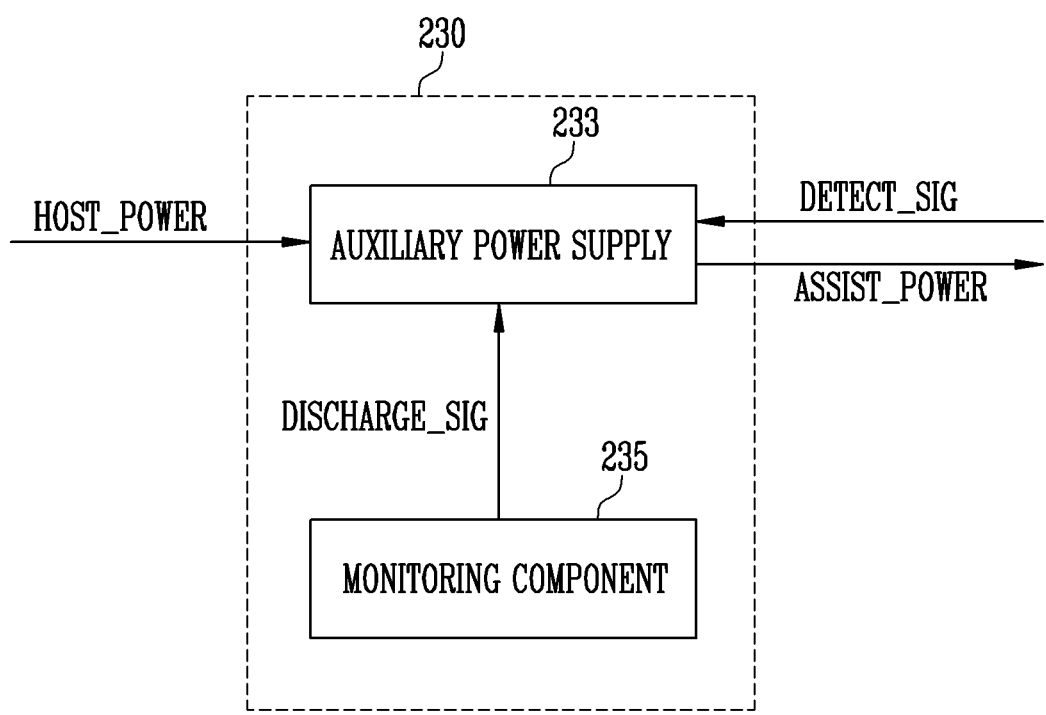
FIG. 6 illustrates an embodiment of supplying assistant power.

FIG. 6 is a diagram illustrating an embodiment to supply assistant power by an auxiliary power supply and monitor the auxiliary power supply.

Referring to FIG. 6, the power loss controller 230 may include an auxiliary power supply 233 and a monitoring component (e.g., a monitor or monitor logic) 235. The auxiliary power supply 233 may supply assistant power (e.g., auxiliary power) ASSIST_POWER to the memory device (e.g., 100 of FIG. 5) in the event of a sudden power-off (SPO). The monitoring component 235 may monitor power supply ability of the auxiliary power supply 233.

In an embodiment, the auxiliary power supply 233 may include a plurality of capacitors. The auxiliary power supply 233 may receive host power HOST_POWER from an external system and may charge the plurality of capacitors with the host power HOST_POWER. The auxiliary power supply 233 may supply assistant power ASSIST_POWER to the memory device (e.g., 100 of FIG. 5) in cases such as the event of a sudden power-off (SPO) through the plurality of charged capacitors.

For example, when the auxiliary power supply 233 receives a detection signal DETECT_SIG from the SPO detector of FIG. 4 (e.g., 210 of FIG. 4) in the event of a sudden power-off (SPO), the auxiliary power supply 233 may supply the assistant power ASSIST_POWER to the memory device (e.g., 100 of FIG. 5).

In an embodiment, in order to provide for a situation of a sudden power-off (SPO) and/or other predetermined conditions, performance of the auxiliary power supply 233 may be monitored at intervals of a preset period. For example, the monitoring component 235 may monitor the auxiliary power supply 233 and output a discharge signal DISCHARGE_SIG to the auxiliary power supply 233 at intervals of a preset period.

When the monitoring component 235 outputs the discharge signal DISCHARGE_SIG to the auxiliary power supply 233 at intervals of a preset period, the auxiliary power supply 233 may suspend charging of the capacitors and then discharge the capacitors. Depending on the levels at which the capacitors are discharged, the ability of the auxiliary power supply 233 to supply the assistant power (ASSIST_POWER) may be evaluated.

For example, it may be evaluated that a larger amount of assistant power ASSIST_POWER can be supplied when the time taken for the capacitors to be discharged is longer (e.g., than a predetermined time). When evaluation of the performance (e.g., ability to supply auxiliary power) of the auxiliary power supply 233 is completed, the capacitors in the auxiliary power supply 233 may be charged again.

In an embodiment, a sudden power-off (SPO) may occur while the capacitors in the auxiliary power supply 233 are being discharged or charged. In this case, when charging of the capacitors is delayed or is not yet completed, the assistant power ASSIST_POWER may not be supplied to the memory device (e.g., 100 of FIG. 5).

Furthermore, when the power loss controller 230 is not operated, the host data HOST_DATA stored in the memory buffer (e.g., 220 of FIG. 5) may not be output as dump data DUMP_DATA to the recovery area (e.g., 231 of FIG. 5).

Therefore, the host data HOST_DATA stored in the memory buffer (e.g., 220 of FIG. 5) may be programmed in a force unit access mode (FUA MODE). For example, the program operation may be completed in such a way that, after the host data HOST_DATA stored in the memory buffer is programmed to the memory device (e.g., 100 of FIG. 5) and map data is updated, a completion response is output to the host (e.g., 300 of FIG. 1).

However, when host data HOST_DATA is programmed in the FUA mode, it may not be possible to determine whether dump data DUMP_DATA stored in the recovery area (e.g., 231 of FIG. 5) has been dumped to and stored in the memory device (e.g., 100 of FIG. 5), when power is turned on after occurrence of an SPO. For example, it may not be possible to determine whether power is turned off after the dump data DUMP_DATA stored in the recovery area has been dumped to and stored in the memory device, or whether power is turned off without dumping the dump data DUMP_DATA stored in the recovery area to the memory device.

In an embodiment, in order to store the host data HOST_DATA, stored in the memory buffer in the memory device through power loss controller 230, charging of auxiliary power supply 233 should be completed. However, a problem may arise where another operation may not be able to be performed while the auxiliary power supply 233 is being charged.

Therefore, in accordance with one or more embodiments a method may be provided of securing the reliability of data without losing data even when charging of the auxiliary power supply 233 is delayed.

Figure 7:
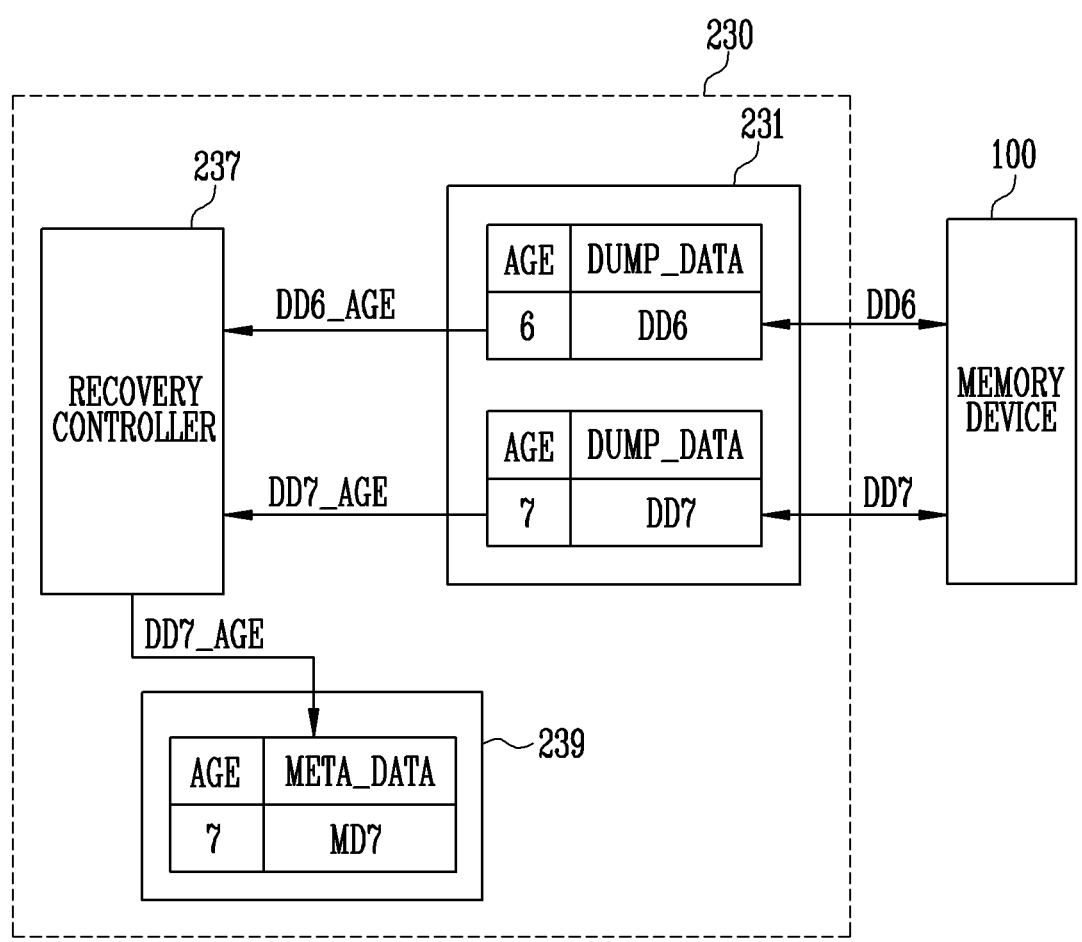
FIG. 7 illustrates an embodiment of a recovery operation.

FIG. 7 illustrates an embodiment of a process in which a recovery operation is performed based on dump data in a recovery area.

Referring to FIG. 7, the power loss controller 230 may include a recovery area 231, a recovery controller 237, and a meta-area 239. The process of FIG. 7 corresponds to the case in which a sudden power-off (SPO) recovery operation (SPO RECOVERY) is performed based on dump data DUMP_DATA output from the recovery area 231 in the event of a sudden power-off (SPO).

In FIG. 7, it is assumed that sixth dump data DD6 is data corresponding to sixth host data HOST_DATA6 output from the host (e.g., 300 of FIG. 1), and seventh dump data DD7 is data corresponding to seventh host data HOST_DATA7 output from the host (e.g., 300 of FIG. 1). In one embodiment, the different dump data may be output from the host at different times for the same SPO or for different SPO occurrences.

Also, in one embodiment, it may be assumed that a sudden power-off (SPO) has occurred before the seventh host data HOST_DATA7 is received from the host (e.g., 300 of FIG. 1) and that the sixth dump data DD6 corresponding to the sixth host data HOST_DATA6 stored in the memory buffer (e.g., 220 of FIG. 5) was dumped to and stored in the recovery area 231 due to the sudden power-off (SPO). Further, it is assumed that the sixth dump data DD6 is output from the recovery area 231 and stored in the memory device 100. Thereafter, it may be assumed that, during the SPO recovery operation, the recovery operation is completed based on the sixth dump data DD6 that is output from the memory device 100 and that is stored in the recovery area 231.

Here, the dump age (AGE) corresponding to the sixth dump data DD6 is assumed to be '6'. Here, the dump age (AGE) may indicate the number of times that data is dumped to the recovery area 231. For example, the dump age may be a value increased by '1' whenever dump data DUMP_DATA is dumped to the recovery area 231. In one embodiment, the dump age may be a value obtained by cumulatively counting the number of times that dump data DUMP_DATA is dumped to the recovery area 231, with the cumulative count corresponding to a dump count. The dump age may be sequentially increased by '1' from a predetermined default value, e.g., '0'. Accordingly, when the dump age (AGE) is '6', the total number of times that data is dumped from the memory buffer (e.g., 220 of FIG. 5) to the recovery area 231 may be '6'.

In embodiment, a program operation may be performed on the seventh host data HOST_DATA7. For example, the seventh host data HOST_DATA7 may be program data output from the host (e.g., 300 of FIG. 1) together with a program request, and the seventh host data HOST_DATA7 may be stored in the memory buffer (e.g., 220 of FIG. 5).

The seventh host data HOST_DATA7 stored in the memory buffer may be output and programmed to the memory device 100.

However, before the seventh host data HOST_DATA7 is programmed, a sudden power-off (SPO) may occur. When a sudden power-off (SPO) occurs at this time, the seventh host data HOST_DATA7 stored in the memory buffer may be dumped to the recovery area 231 of the power loss controller 230, and then may be stored in the memory device 100.

For example, after the seventh dump data DD7 corresponding to the seventh host data HOST_DATA7 has been stored in the recovery area 231, the seventh dump data DD7 stored in the recovery area 231 may be dumped in the memory device 100. Here, the dump age (AGE) corresponding to the seventh dump data DD7 may be '7'. Since the dump age (AGE) is '7', the total number of times that data is dumped from the memory buffer to the recovery area 231 may be '7'.

However, when a sudden power-off (SPO) occurs while the capacitors in the auxiliary power supply (e.g., 233 of FIG. 6) of the power loss controller 230 are being discharged or charged, the seventh host data HOST_DATA7 stored in the memory buffer may be programmed in a force unit access mode (FUA MODE) without being dumped to recovery area 231.

In one embodiment, it is assumed that charging of the capacitors in the auxiliary power supply (e.g., 233 of FIG. 6) is completed. Therefore, when a sudden power-off (SPO) occurs before the seventh host data HOST_DATA7 is programmed, the seventh host data HOST_DATA7 may be dumped to the recovery area 231 and then stored in memory device 100. For example, when a sudden power-off (SPO) occurs before the seventh host data HOST_DATA7 is programmed, the seventh host data HOST_DATA7 stored in the memory buffer may be dumped to the recovery area 231.

After the seventh host data HOST_DATA7 has been dumped to the recovery area 231, the sixth and seventh dump data DD6 and DD7 stored in the recovery area 231 may be output to and stored in the memory device 100. The sixth dump data DD6 may be data dumped from the memory buffer prior to the seventh dump data DD7. When the sixth and seventh dump data DD6 and DD7 are stored in the memory device 100, power may be turned off.

Thereafter, during a SPO recovery operation, the sixth and seventh dump data DD6 and DD7 may be output from the memory device 100 and the may be stored in the recovery area 231. When the sixth and seventh dump data DD6 and DD7 are stored in the recovery area 231, the recovery controller 237 may perform an SPO recovery operation based on the sixth and seventh dump data DD6 and DD7.

In accordance with one or more embodiments, before the SPO recovery operation is performed, the recovery controller 237 may receive, from the recovery area 231, information indicative of a dump age (AGE) corresponding to each item of dump data. The recovery controller 237 may perform a recovery operation by comparing the received dump ages AGE with each other. For example, before the SPO recovery operation is performed, the recovery controller 237 may receive a sixth dump age DD6_AGE of '6' corresponding to the sixth dump data DD6 and a seventh dump age DD7_AGE of '7' corresponding to the seventh dump data DD7, from the recovery area 231.

After receiving information indicative of the sixth and seventh dump ages DD6_AGE and DD7_AGE, the recovery controller 237 may perform a recovery operation based on dump data corresponding to a largest dump age (AGE). For example, as a result of comparing the sixth and seventh dump ages DD6_AGE and DD7_AGE with each other, the recovery controller 237 may perform a recovery operation based on the seventh dump data DD7 corresponding to the seventh dump age DD7_AGE that is the largest dump age.

In an embodiment, after performing the recovery operation based on the seventh dump data DD7, the recovery controller 237 may store a meta-age of metadata META_DATA corresponding to the seventh dump data DD7 in the meta-area 239. Here, the metadata corresponding to the seventh dump data DD7 may be seventh metadata, and may include mapping data or the like.

Thereafter, when another SPO occurs, a recovery operation may be performed based on the dump age (AGE) stored in the recovery area 231 and the meta-age AGE stored in the meta-area 239.

Figure 8:
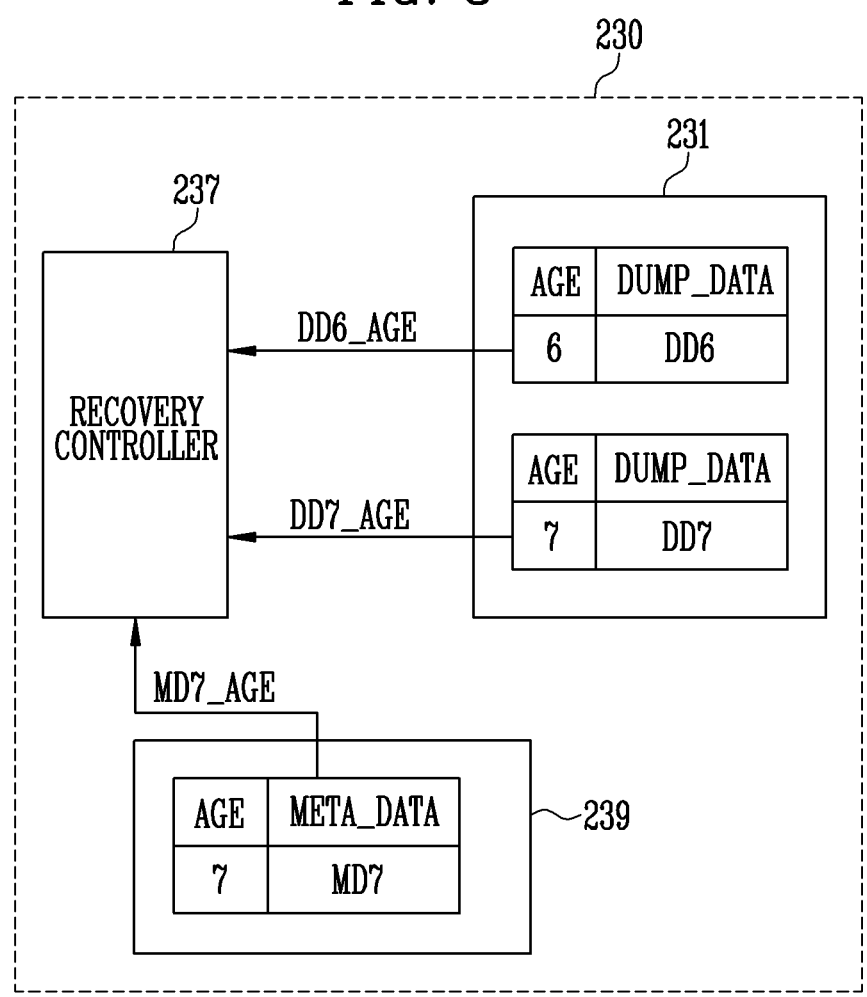
FIG. 8 illustrates an embodiment in which an additional sudden power-off (SPO) occurs after a recovery operation corresponding to a sudden power-off has been completed.

FIG. 8 illustrates an embodiment in which an additional sudden power-off occurs after a recovery operation corresponding to a sudden power-off has been completed in FIG. 7. In FIG. 8, a case is illustrated where an additional SPO occurs after a recovery operation has been performed by the recovery controller 237 based on dump ages of respective items of dump data stored in the recovery area 231. In this case, the additional SPO may occur while a program operation is performed on eighth host data HOST_DATA8 received from the host (e.g., 300 of FIG. 1). Thus, the embodiment of FIG. 8 may include the case where an additional SPO occurs after the recovery controller 237 has performed the recovery operation based on the seventh dump data DD7.

In an embodiment, a sudden power-off (SPO) may occur during charging of a plurality of capacitors, either while an operation of monitoring the auxiliary power supply (e.g., 233 of FIG. 6) is performed at intervals of a preset period or after the monitoring operation has been performed. For example, a sudden power-off (SPO) may occur while the capacitors in the auxiliary power supply are being charged.

In this case, the power loss controller 230 may not be operated because charging of the auxiliary power supply is delayed or is not yet complete. For example, eighth host data HOST_DATA8 stored in the memory buffer, to which programming has not yet been completed, may not be dumped to the recovery area 231. Therefore, the eight host data HOST_DATA8 may be programmed in a force unit access mode (FUA MODE).

For example, the program operation may be completed in such a way that, after the eighth host data HOST_DATA8, stored in the memory buffer is programmed to the memory device and map data is updated, a completion response is output to the host.

Thereafter, during the SPO recovery operation, the dump data output from the memory device may be output to and stored in the recovery area 231. When the dump data is stored in the recovery area 231, the recovery controller 237 may receive (from the recovery area 231) information indicative of dump ages (AGE) corresponding to respective items of dump data DUMP_DATA before the SPO recovery operation is performed. Further, the recovery controller 237 may receive a meta-age (AGE) corresponding to metadata META_DATA from the meta-area 239.

In an embodiment, the recovery controller 237 may perform the recovery operation by comparing the received dump ages (AGE) and the meta-age with each other. For example, the recovery controller 237 may perform the recovery operation based on the result of comparing a largest value of the received dump ages with the most recently stored meta-age.

Referring to FIG. 8, the recovery controller 237 may receive, from the recovery area 231, a sixth dump age DD6_AGE of '6' corresponding to the sixth dump data DD6, and a seventh dump age DD7_AGE of '7' corresponding to the seventh dump data DD7. Also, the recovery controller 237 may receive a seventh meta-age MD7_AGE of '7' corresponding to the seventh metadata MD7. Out of the sixth and seventh dump ages DD6_AGE and DD7_AGE, the larger value is the seventh dump age DD7_AGE, namely '7'. Thus, the values corresponding to the seventh dump age DD7_AGE and the seventh meta-age MD7_AGE may be the same.

When the values corresponding to the seventh dump age DD7_AGE and the seventh meta-age MD7_AGE are the same as '7', the recovery controller 237 may determine that the recovery operation has been performed based on the dump data stored in recovery area 231. Therefore, the recovery controller 237 may be determined to have completed the recovery operation based on the seventh dump data DD7 stored in the recovery area 231. In this case, the recovery controller 237 may perform the recovery operation without regard to the seventh dump data DD7. That is, the recovery operation may be performed when the two values are the same based on a comparison of the largest value of the dump ages with the value of the most recently stored meta-age, and this such an operation may be performed regardless of the dump data stored in recovery area 231.

Because the recovery controller 237 performs a recovery operation by comparing the dump age with the meta-age, and because dump data for which a recovery operation has already been completed is not programmed again to the memory device, the eighth host data HOST_DATA8 (e.g., which is new data programmed to the memory device) in the FUA mode may not be replaced with seventh host data HOST_DATA7.

Figure 9:
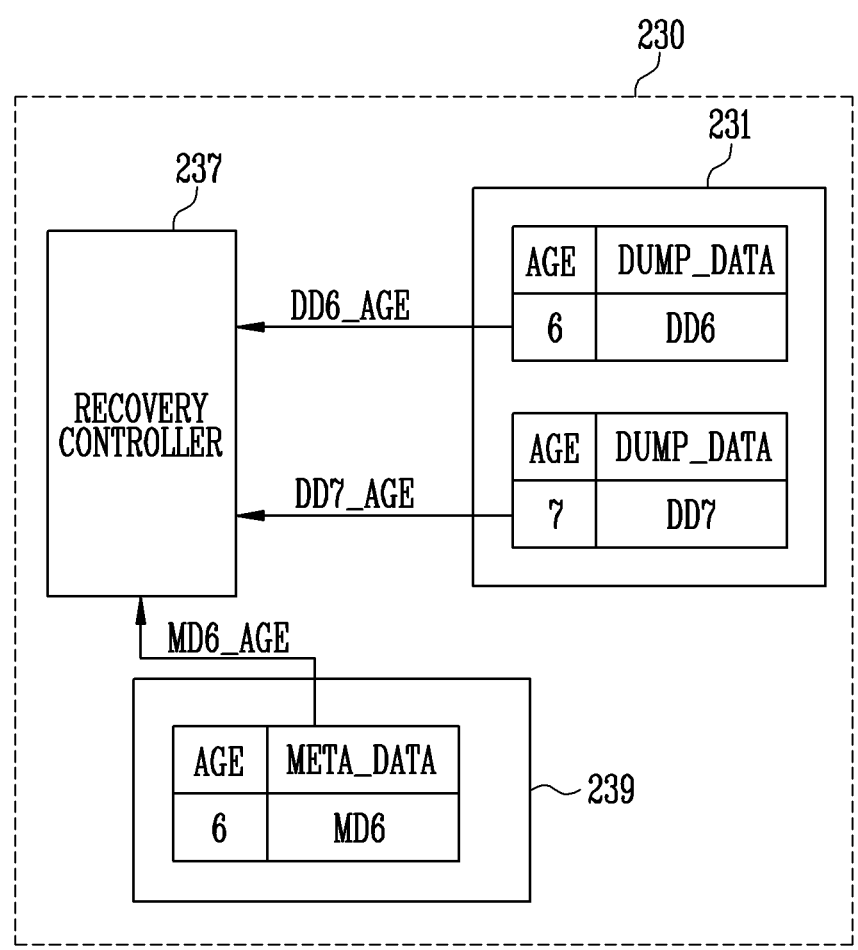
FIG. 9 illustrates an embodiment in which an additional sudden power-off occurs when an SPO recovery operation is not yet completed.

FIG. 9 illustrates an embodiment in which an additional sudden power-off occurs in the state in which an SPO recovery operation is not yet completed in FIG. 7. In FIG. 9, the case is illustrated where dump data dumped to the memory device is output again to and stored in the recovery area 231 when the recovery controller 237 performs a recovery operation corresponding to a sudden power-off (SPO) as in FIG. 7. However, in this case, the recovery operation is not completed and an additional SPO occurs.

Thus, the embodiment of FIG. 9 may include the case where an additional SPO occurs while the recovery controller 237 is performing a recovery operation based on the seventh dump data DD7, depending on the result of comparing sixth and seventh dump ages DD6_AGE and DD7_AGE with each other.

In an embodiment, an additional SPO may occur while a program operation is performed on the seventh host data HOST_DATA7. When an additional SPO occurs, sixth and seventh dump data DD6 and DD7 stored in the recovery area 231 may be output to and stored in the memory device.

Thereafter, when sixth and seventh dump data DD6 and DD7 are output from the memory device and are stored in the recovery area 231, the recovery controller 237 may receive the sixth dump age DD6_AGE corresponding to the sixth dump data DD6 and the seventh dump age DD7_AGE corresponding to the seventh dump data DD7 from the recovery area 231, and may perform a recovery operation based on the result of comparing the sixth dump age DD6_AGE with the seventh dump age DD7_AGE. For example, when the seventh dump age DD7_AGE is greater than the sixth dump age DD6_AGE (7>6), the recovery controller 237 may perform a recovery operation based on the seventh dump data DD7 corresponding to the seventh dump age DD7_AGE.

However, in FIG. 9, an additional SPO may occur while the recovery controller 237 is performing the recovery operation. When an additional SPO occurs, the sixth and seventh dump data DD6 and DD7 stored in the recovery area 231 may be output to and stored in the memory device.

In this case, unlike FIG. 7, since the recovery operation based on the seventh dump data DD7 is not yet completed, the recovery controller 237 may not store, in the meta-area 239, the meta-age AGE of the metadata META_DATA corresponding to the seventh dump data DD7. Therefore, the meta-age that has been most recently stored in the meta-area may be the sixth meta-age MD6_AGE corresponding to the sixth metadata MD6.

Thereafter, during the SPO recovery operation, the dump data output from the memory device may again be output to and stored in the recovery area 231. When the dump data is stored in the recovery area 231, the recovery controller 237 may receive (from the recovery area 231 before the SPO recovery operation is performed) information indicative of dump ages (AGE) corresponding to respective items of dump data DUMP_DATA. Further, the recovery controller 237 may receive information indicative of a meta-age (AGE) corresponding to the most recently stored metadata META_DATA from the meta-area 239.

In an embodiment, the recovery controller 237 may perform the recovery operation by comparing the received dump ages (AGE) and the meta-age with each other. For example, the recovery controller 237 may perform the recovery operation based on the result of comparing a largest value of the received dump ages with the value of the most recently stored meta-age.

Referring to FIG. 9, the recovery controller 237 may receive, from the recovery area 231, a sixth dump age DD6_AGE of '6' corresponding to the sixth dump data DD6 and a seventh dump age DD7_AGE of '7' corresponding to the seventh dump data DD7. Also, the recovery controller 237 may receive a sixth meta-age MD6_AGE of '6' corresponding to the sixth metadata MD6. Since the larger value of the sixth and seventh dump ages DD6_AGE and DD7_AGE is the seventh dump age DD7_AGE (namely '7'), the value corresponding to the seventh dump age DD7_AGE and the value corresponding to the most recently stored sixth meta-age MD6_AGE may be different from each other.

When the value corresponding to the seventh dump age DD7_AGE and the value corresponding to the sixth meta-age MD6_AGE are different from each other, the recovery controller 237 may determine that the recovery operation has not been performed based on the dump data stored in the recovery area 231.

Therefore, since the recovery operation based on the seventh dump data DD7 stored in the recovery area 231 is not yet performed, the recovery controller 237 may perform the recovery operation based on the seventh dump data DD7. For example, as a result of comparing the largest value of the dump ages with the value of the most recently stored meta-age, when the two values are different from each other, the recovery operation may be performed based on the dump data stored in the recovery area 231.

Accordingly, since the recovery controller 237 performs a recovery operation by comparing the dump age with the meta-age, a program operation may be performed on the memory device based on the dump data on which a recovery operation is not performed. Thus, the seventh host data HOST_DATA7 corresponding to the seventh dump data DD7 is prevented from being lost.

Figure 10:
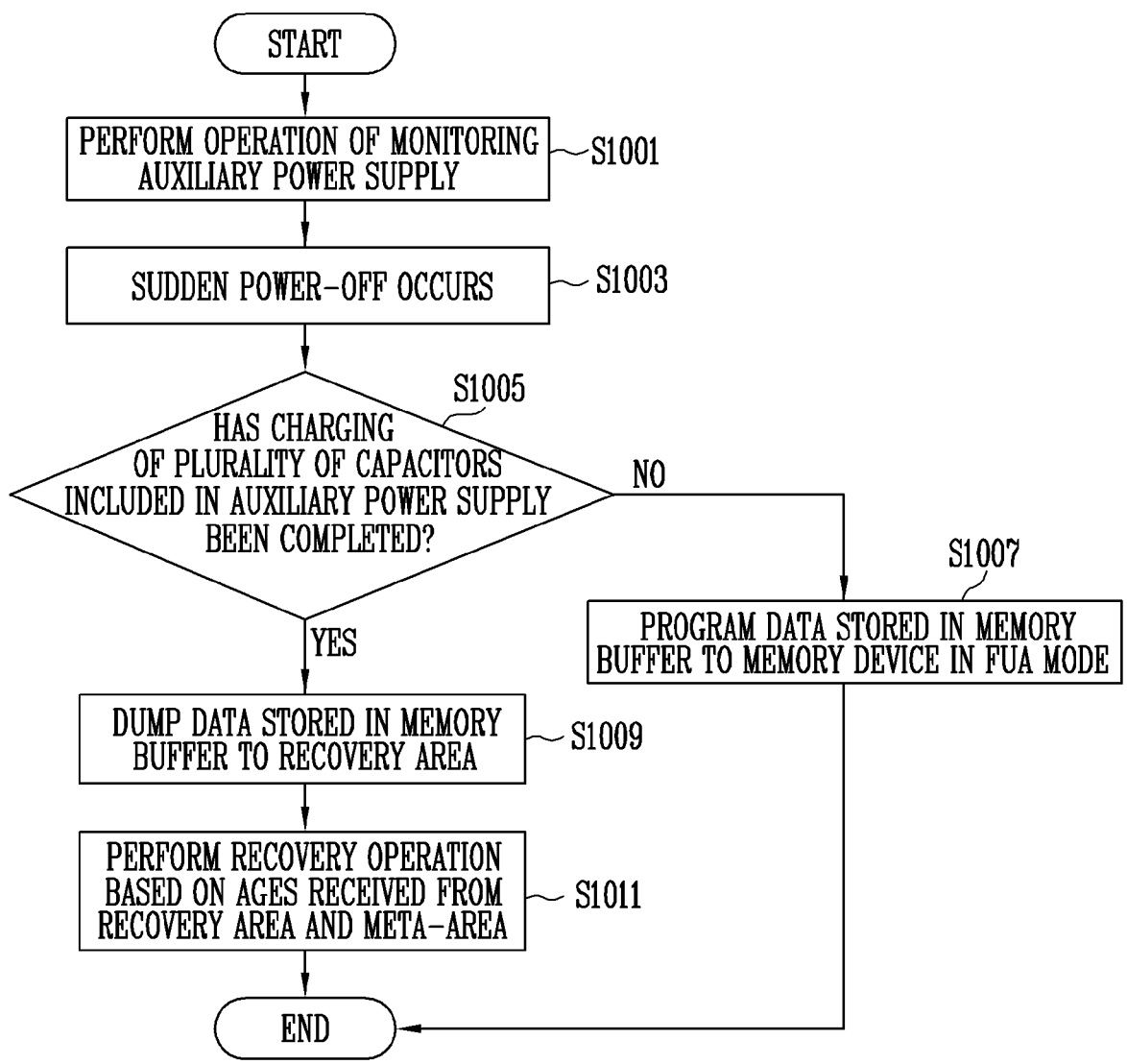
FIG. 10 illustrates an embodiment of a method of operating a memory controller.

FIG. 10 is a flowchart illustrating an embodiment of a method of operation of a memory controller, which, for example, may correspond to one or more embodiments of the memory controller described herein.

Referring to FIG. 10, at S1001, the memory controller may perform an operation of monitoring an auxiliary power supply. The auxiliary power supply may be included in or coupled to the memory controller, and may supply auxiliary (or assist) power to the memory device in the event of a sudden power-off (SPO).

In an embodiment, in order to provide for a situation of a sudden power-off (SPO) or other form of power interruption, performance of the auxiliary power supply may be monitored, for example, at intervals of a preset period. The performance may be monitored, for example, based on levels at which the capacitors in the auxiliary power supply are discharged.

At S1003, a sudden power-off (SPO) may occur. For example, an SPO may occur after charging the capacitors in the auxiliary power supply has been completed, or may occur while discharging or charging the capacitors is being performed.

At S1005, the memory controller may determine whether the operation of charging the capacitors in the auxiliary power supply has been completed. For example, the memory controller may determine whether an SPO has occurred after charging of the capacitors in the auxiliary power supply has been completed, or whether an SPO has occurred while discharging or charging of the plurality of capacitors is being performed.

When charging the capacitors in the auxiliary power supply is not completed (e.g., in the case of N), the process may proceed to S1007. When the charging the capacitors in the auxiliary power supply has been completed (e.g., in the case of Y), the process may proceed to S1009.

At S1007, the memory controller may program data stored in the memory buffer to the memory device in a force unit access mode (FUA MODE). For example, when an SPO occurs while discharging or charging of the capacitors in the auxiliary power supply is being performed (e.g., when charging of the capacitors in the auxiliary power supply has not yet been completed), the auxiliary power supply may not supply assistant power. In this case, the memory controller may program the data stored in the memory buffer in the FUA mode. For example, the program operation may be completed such that a completion response is output to the host after the data stored in the memory buffer is programmed to the memory device and map data is updated.

At S1009, the memory controller may dump the data stored in the memory buffer to the recovery area. For example, when an SPO occurs after charging of the capacitors in the auxiliary power supply has been completed, the auxiliary power supply may supply the assistant power. In this case, the memory controller may dump the data stored in the memory buffer to the recovery area using the assistant power, and the dump data dumped to the recovery area may be stored in the memory device.

At S1011, the memory controller may perform a recovery operation based on age information received from the recovery area and a meta-area. For example, when the largest value of dump ages corresponding to the dump data stored in the recovery area is equal to the value of a meta-age corresponding to most recently stored metadata, the recovery operation may be performed regardless of the data stored in the recovery area.

However, when the largest value of the dump ages corresponding to the dump data stored in the recovery area is different from the value of a meta-age corresponding to the most recently stored metadata, the recovery operation may be performed based on dump data corresponding to the largest value of the dump ages. When the memory controller performs the recovery operation based on the dump data, the memory controller may store a dump age corresponding to the dump data in the meta-area.

Figure 11:
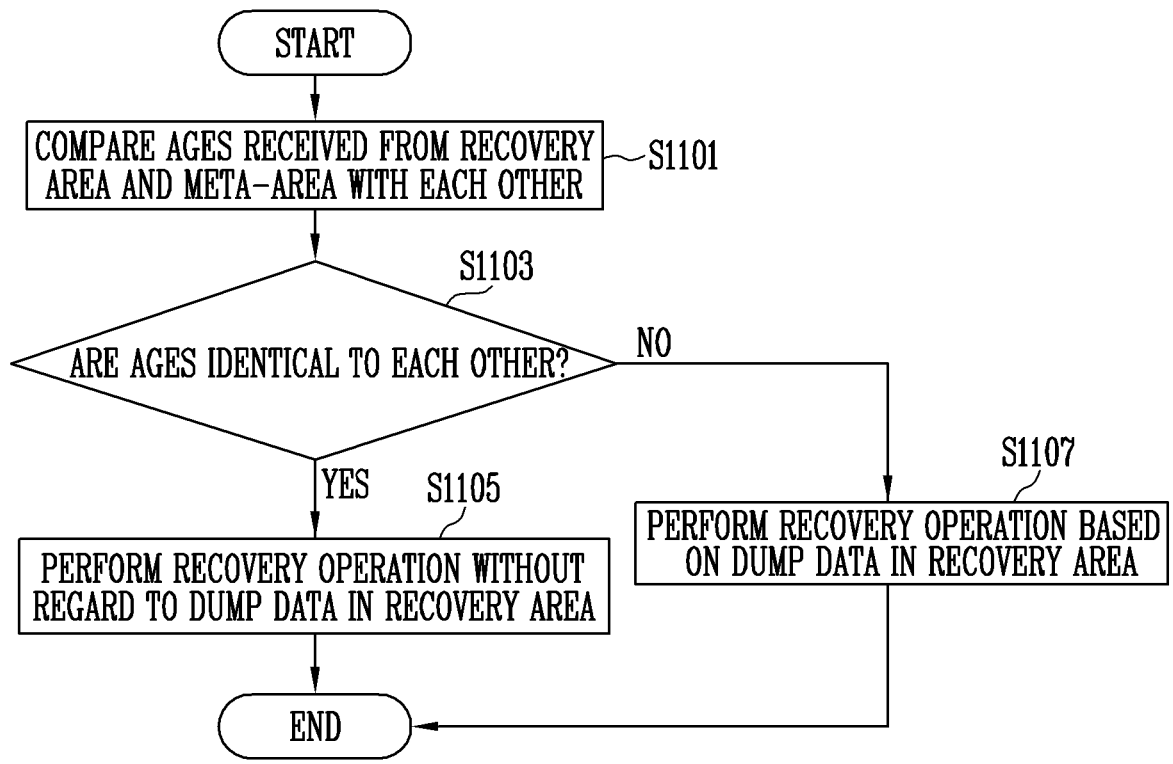
FIG. 11 illustrates an embodiment of a method of operating a memory controller.

FIG. 11 is a flowchart illustrating an embodiment of a method of operating a memory controller, which, for example, may be one or more of the aforementioned embodiments of the memory controller. Referring to FIGS. 10 and 11, operations obtained by subdividing operation S1011 of FIG. 10 are illustrated in FIG. 11.

At S1101, the memory controller may compare ages based on information received from the recovery area and the meta-area. For example, the memory controller may receive dump ages respectively corresponding to items of dump data stored in the recovery area and a meta-age corresponding to metadata stored in the meta-area. The memory controller may then compare the largest value of the received dump ages with the value of the most recently stored meta-age.

At S1103, the memory controller may determine whether the largest value of the received dump ages is equal to the most recently stored meta-age. When it is determined that the largest value is equal to the most recently stored meta-age (e.g., in the case of Y), the process may proceed to operation S1105. When it is determined that the largest value is different from the most recently stored meta-age (e.g., in the case of N), the process may proceed to operation S1107.

At S1105, the memory controller may perform a recovery operation without regard to the dump data stored in the recovery area. For example, when the largest value of the dump ages is equal to the most recently stored meta-age (e.g., in the case of Y), the memory controller may determine that the recovery operation is performed based on the dump data stored in the recovery area. Therefore, since the memory controller has completed the recovery operation based on the dump data stored in the recovery area, the memory controller may perform the recovery operation without regard to the dump data.

At S1107, the memory controller may perform the recovery operation based on the dump data stored in the recovery area. For example, when the largest value of the dump ages is not equal to the most recently stored meta-age, the memory controller may determine that the recovery operation has not been performed based on the dump data stored in the recovery area. Because the recovery operation has not been performed, the memory controller may perform the recovery operation based on the dump data stored in the recovery area.

Figure 12:
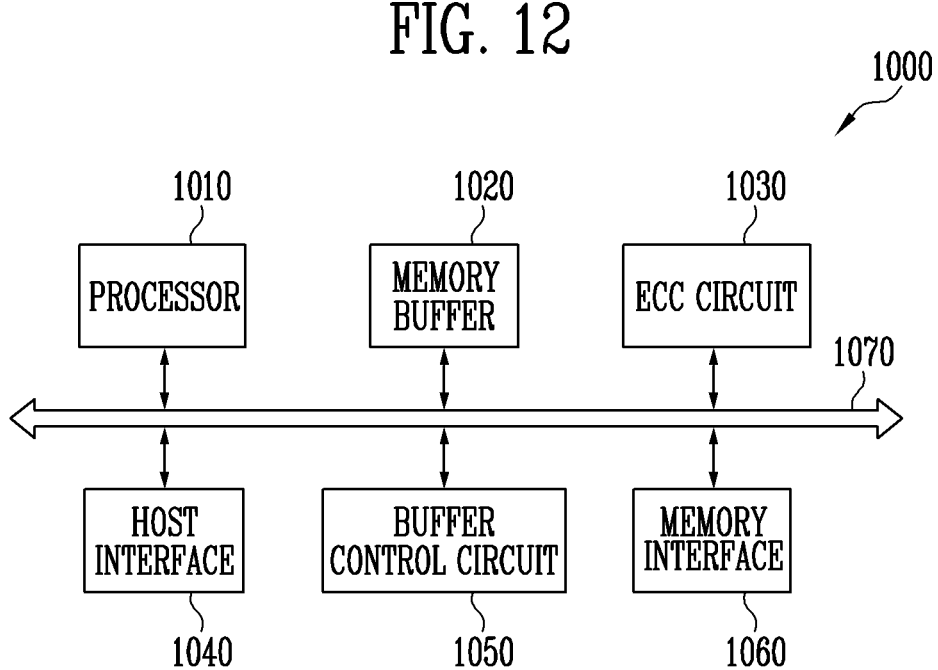
FIG. 12 illustrates an embodiment of a memory controller.

FIG. 12 is a diagram illustrating an embodiment of memory controller, which, for example, may correspond to any of the embodiments of a memory controller described herein.

A memory controller 1000 is coupled to a host and a memory device. The memory controller 1000 may access the memory device in response to a request from the host. For example, the memory controller 1000 may be configured to control write, read, erase, and background operations of the memory device. The memory controller 1000 may serve as an interface between the memory device and the host. The memory controller 1000 may execute instructions (e.g., run firmware) for controlling the memory device.

Referring to FIG. 12, the memory controller 1000 may include a processor 1010, a memory buffer 1020, an error correction code (ECC) circuit 1030, a host interface 1040, a buffer control circuit 1050, a memory interface 1060, and a bus 1070. The bus 1070 may provide channels between components of the memory controller 1000.

The processor 1010 may control overall operation of the memory controller 1000 and may perform various logical operations. The processor 1010 may communicate with an external host through the host interface 1040, and also may communicate with the memory device through the memory interface 1060. Further, processor 1010 may communicate with the memory buffer 1020 through the buffer control circuit 1050. The processor 1010 may control the operation of the storage device using memory buffer 1020 as a working memory, a cache memory or a buffer memory.

In one embodiment, the processor 1010 may perform the function of a flash translation layer (FTL). The processor 1010 may translate a logical block address (LBA), provided by the host, to a physical block address (PBA) through the FTL. The FTL may receive the LBA and translate the LBA into the PBA using a mapping table. Examples of an address mapping method performed through the FTL may include various methods according to a mapping unit. Representative address mapping methods include a page mapping method, a block mapping method, and a hybrid mapping method.

The processor 1010 may randomize data received from the host. For example, the processor 1010 may use a randomizing seed to randomize data received from the host. The randomized data may be provided, as data to be stored, to the memory device and may be programmed in the memory cell array.

The processor 1010 may run software or firmware to perform the randomizing or derandomizing operation. In an embodiment, the processor 1010 may run software or firmware to perform randomizing and derandomizing operations.

The memory buffer 1020 may be used as a working memory, a cache memory, or a buffer memory of the processor 1010. The memory buffer 1020 may store codes and commands executed by the processor 1010. The memory buffer 1020 may store data that is processed by the processor 1010. The memory buffer 1020 may include a static RAM (SRAM) or a dynamic RAM (DRAM).

The ECC circuit 1030 may perform error correction, e.g., the ECC circuit 1030 may perform error correction code (ECC) encoding based on data to be written to the memory device through the memory interface 1060. The ECC-encoded data may be transferred to the memory device through the memory interface 1060. The ECC circuit 1030 may perform ECC decoding based on data received from the memory device through the memory interface 1060. In an example, the ECC circuit 1030 may be included in the memory interface 1060.

The host interface 1040 may communicate with the external host under the control of the processor 1010. The host interface 1040 may perform communication using at least one of various communication methods. Examples include a Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe-E), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The buffer control circuit 1050 may control the memory buffer 1020 under the control of the processor 1010.

The memory interface 1060 may communicate with the memory device under the control of the processor 1010. The memory interface 1060 may transmit/receive commands, addresses, and data to/from the memory device through channels.

In an embodiment, the memory controller 1000 may not include the memory buffer 1020 and the buffer control circuit 1050.

In an embodiment, the processor 1010 may control operation of the memory controller 1000 using codes. The processor 1010 may load codes from a nonvolatile memory device (e.g., ROM) in the memory controller 1000. In an embodiment, the processor 1010 may load codes from the memory device through the memory interface 1060.

In an embodiment, the bus 1070 of the memory controller 1000 may include a control bus and a data bus. The data bus may be configured to transmit data in the memory controller 1000, and the control bus may be configured to transmit control information such as commands or addresses in the memory controller 1000. The data bus and the control bus may be isolated from each other and neither may interfere with each other nor influence each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

In an embodiment, when a sudden power-off (SPO) occurs while the memory device (e.g., 100 of FIG. 1) is performing a program operation, the processor 1010 may control operations subsequent to the SPO. For example, when an SPO is detected, data stored in the memory buffer 1020 may be programmed to the memory device in a force unit access mode (FUA MODE), after which power may be turned off. In one embodiment, data stored in the memory buffer 1020 may be dumped to a recovery area in the memory controller 1000 and then may be stored in the memory device, after which power may be turned off.

In an embodiment, an SPO may occur after charging of a plurality of capacitors in an auxiliary power supply in the memory controller 1000 has been completed. In one embodiment, an SPO may occur while discharging or charging of the capacitors is being performed.

When charging of the capacitors is not completed, the auxiliary power supply may not supply assistant power. Therefore, in this case, after the processor 1010 may program the data stored in the memory buffer 1020 in the FUA mode, power may be turned off.

When charging of the capacitors is completed, the auxiliary power supply may supply assistant power. Therefore, in this case, the processor 1010 may dump the data stored in the memory buffer 1020 to the recovery area using the assistant power, and the dump data which has been dumped to the recovery area may be stored in the memory device.

Thereafter, when power is turned on and an SPO recovery operation is performed, the processor 1010 may perform a recovery operation based on a largest value of dump ages corresponding to the dump data stored in the recovery area, and the value of a meta-age corresponding to most recently stored metadata. The dump age may indicate the number of times that data is dumped to the recovery area. The meta-age may be a value corresponding to the dump age in which the recovery operation is performed.

When, for example, the largest value of dump ages corresponding to the dump data stored in the recovery area is not equal to the value of the meta-age corresponding to the most recently stored metadata, it may be determined that the recovery operation has not been performed. Therefore, the processor 1010 may perform a recovery operation based on the dump data stored in the recovery area.

When the largest value of dump ages corresponding to the dump data stored in the recovery area is equal to the value of the meta-age corresponding to the most recently stored metadata, it may be determined that the recovery operation has been performed. Therefore, the processor 1010 may perform a recovery operation regardless of (e.g., without regard to) the dump data stored in the recovery area.

Figure 13:
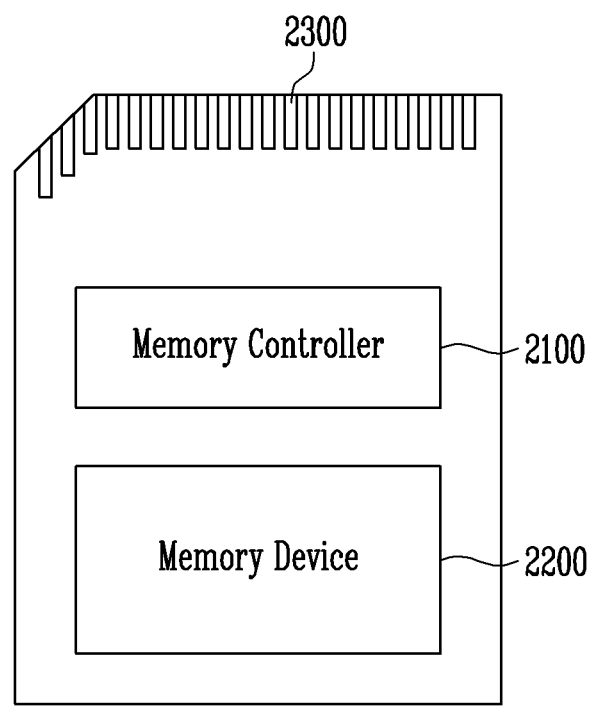
FIG. 13 illustrates an embodiment of a memory card system.

FIG. 13 is a block diagram illustrating an embodiment of a memory card system, to which any of the embodiments of the storage device described herein may be applied.

Referring to FIG. 13, a memory card system 2000 may include a memory controller 2100, a memory device 2200, and a connector 2300. The memory controller 2100 is coupled to and may access the memory device 2200. The memory controller 2100 may control read, write, erase, and/or background operations of the memory device 2200. The memory controller 2100 may serve as an interface between the memory device 2200 and a host. The memory controller 2100 may execute instructions (e.g., run firmware) for controlling the memory device 2200. The memory device 2200 may be implemented in the same way as the memory device described with reference to FIG. 1.

In an embodiment, the memory controller 2100 may include components, such as a RAM, a processor, a host interface, a memory interface, and/or an ECC circuit.

The memory controller 2100 may communicate with an external device (e.g., a host) through the connector 2300 based on one or more communication protocols. Examples include a universal serial bus (USB), multi-media card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be compatible with at least one of these communication protocols.

In an embodiment, the memory device 2200 may be implemented as a nonvolatile memory device. Examples include an Electrically Erasable and Programmable ROM (EEPROM), a NAND flash memory, a NOR flash memory, a Phase-change RAM (PRAM), a Resistive RAM (RRAM), a Ferroelectric RAM (FRAM), a Spin Transfer Torque Magnetic RAM (STT-MRAM).

The memory controller 2100 and the memory device 2200 may be integrated into a single semiconductor device to configure a memory card. Examples include a PC card (personal computer memory card international association: PCMCIA), a compact flash card (CF), a smart media card (SM or SMC), a memory stick, a multimedia card (MMC, RS-MMC, MMCmicro or eMMC), a SD card (SD, miniSD, microSD, or SDHC), or a universal flash storage (UFS).

In an embodiment, when a sudden power-off (SPO) occurs while the memory device 2200 is performing a program operation, the memory controller 2100 may control operations subsequent to the SPO. For example, when an SPO is detected, data stored in the memory buffer may be programmed to the memory device 2200 in a force unit access mode (FUA MODE), after which power may be turned off. In one embodiment, data stored in the memory buffer may be dumped to a recovery area in the memory controller 2100 and then may be stored in the memory device 2200, after which power may be turned off.

In an embodiment, an SPO may occur after charging of a plurality of capacitors in an auxiliary power supply in the memory controller 2100 has been completed. In one embodiment, an SPO may occur while discharging or charging of the capacitors is being performed.

When charging of the capacitors is not completed, the auxiliary power supply may not supply assistant power. In this case, power may be turned off after the memory controller 2100 may program the data stored in the memory buffer in the FUA mode.

When charging of the capacitors is completed, the auxiliary power supply may supply assistant power. In this case, the memory controller 2100 may dump the data stored in the memory buffer to the recovery area using the assistant power, and the dump data dumped to the recovery area may be stored in the memory device 2200.

Thereafter, when power is turned on and an SPO recovery operation is performed, the memory controller 2100 may perform a recovery operation based on a largest value of dump ages corresponding to the dump data stored in the recovery area, and the value of a meta-age corresponding to the most recently stored metadata. The dump age may indicate the number of times that data is dumped to the recovery area, and the meta-age may be a value corresponding to the dump age in which the recovery operation is performed.

For example, when the largest value of dump ages corresponding to the dump data stored in the recovery area is not equal to the value of the meta-age corresponding to the most recently stored metadata, it may be determined that the recovery operation has not been performed. Therefore, the memory controller 2100 may perform a recovery operation based on the dump data stored in the recovery area.

When the largest value of dump ages corresponding to the dump data stored in the recovery area is equal to the value of the meta-age corresponding to the most recently stored metadata, it may be determined that the recovery operation has been performed. Therefore, the memory controller 2100 may perform a recovery operation regardless of (e.g., without regard to) the dump data stored in the recovery area.

Figure 14:
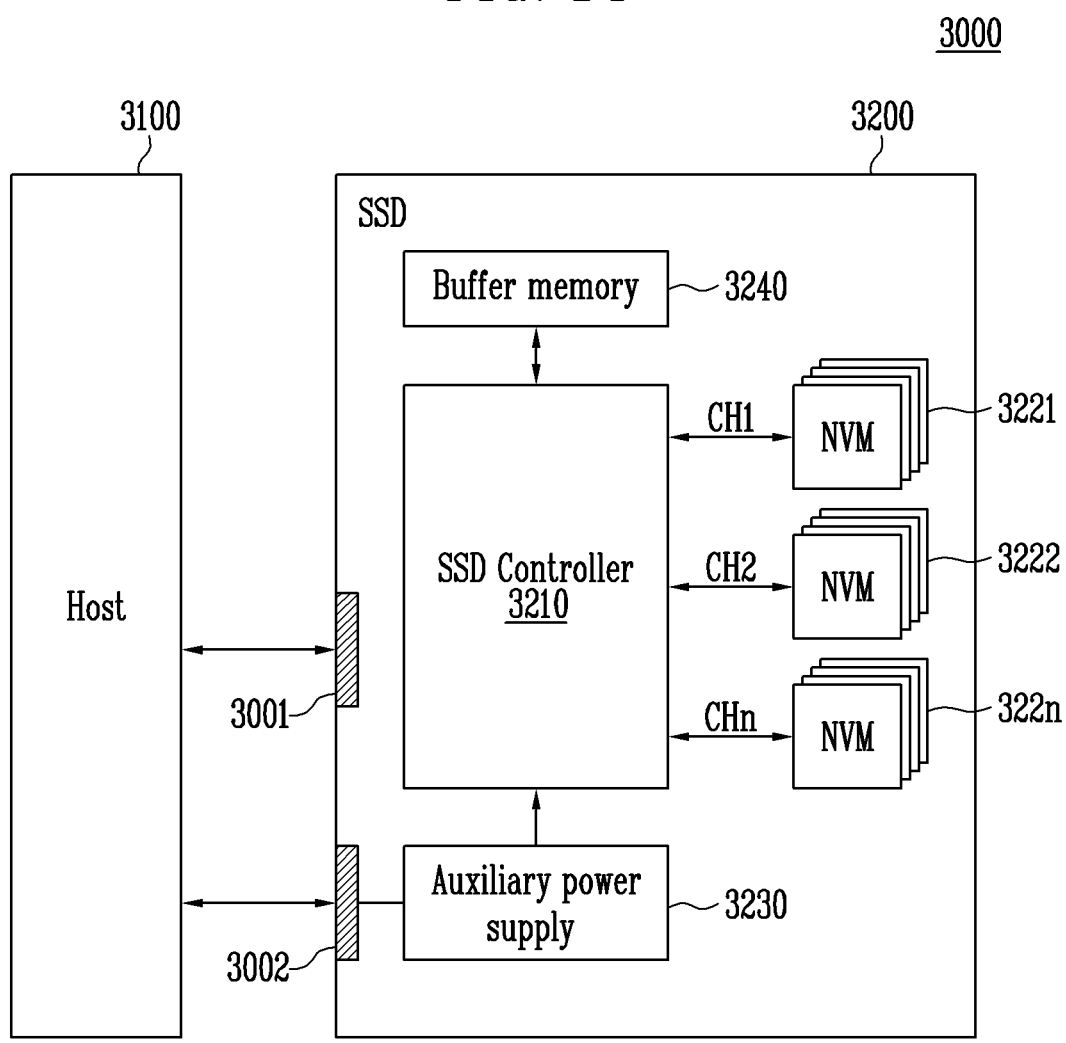
FIG. 14 illustrates an embodiment of a solid state drive system.

FIG. 14 is a block diagram illustrating an embodiment of a solid state drive (SSD) system, to which a storage device according to any of embodiments described herein may be applied.

Referring to FIG. 14, an SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322*n*, an auxiliary power supply 3230, and a buffer memory 3240.

In an embodiment, the SSD controller 3210 may perform the function of the memory controller (e.g., 200 of FIG. 1) described with reference to FIG. 1. For example, the SSD controller 3210 may control the flash memories 3221 to 322*n* in response to the signals SIG from the host 3100. In an embodiment, the signals SIG may be signals compatible with interfaces of the host 3100 and the SSD 3200. Examples of the interfaces include universal serial bus (USB), multi-media card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100 and, for example, may be charged based on that power PWR. The auxiliary power supply 3230 may supply the power of the SSD 3200 when the supply of power from the host 3100 does not conform to a predetermined level or pattern, e.g., is not smoothly performed. In an embodiment, the auxiliary power supply 3230 may be in the SSD 3200 or external and coupled to the SSD 3200. For example, the auxiliary power supply 3230 may be in a main board and may supply auxiliary power to the SSD 3200.

The buffer memory 3240 functions as a buffer memory of the SSD 3200. For example, the buffer memory 3240 may temporarily store data from the host 3100 or data from the flash memories 3221 to 322n, and/or may temporarily store metadata (e.g., mapping tables) of the flash memories 3221 to 322n. The buffer memory 3240 may be a volatile memory (e.g., DRAM, SDRAM, DDR SDRAM, LPDDR SDRA, GRAM) or a nonvolatile memory (e.g., FRAM, RRAM, STT-MRAM, PRAM).

In an embodiment, when a sudden power-off (SPO) occurs while any one of the flash memories 3221 to 322n is performing a program operation, the SSD controller 3210 may control operations subsequent to the SPO. For example, when an SPO is detected, data stored in the buffer memory 3240 may be programmed to one or more of the flash memories 3221 to 322n in a force unit access mode (FUA MODE). Then, power may be turned off. In one embodiment, data stored in the buffer memory 3240 may be dumped to a recovery area in the SSD controller 3210, and then may be stored in the flash memories 3221 to 322n, after which power may be turned off.

In one case, an SPO may occur after charging of one or more capacitors in the auxiliary power supply 3230 has been completed. In another case, an SPO may occur while discharging or charging of the one or more capacitors is being performed.

When charging of the capacitors is not completed, the auxiliary power supply 3230 may not supply assistant power. In this case, after the SSD controller 3210 programs the data stored in the buffer memory 3240 in the FUA mode, power may be turned off.

When charging of the one or more capacitors is completed, the auxiliary power supply 3230 may supply the assistant power. In this case, the SSD controller 3210 may dump the data stored in the buffer memory 3240 to the recovery area using the assistant power, and the dump data (dumped to the recovery area) may be stored in at least one of the flash memories 3221 to 322n.

When power is turned back on and an SPO recovery operation is performed, the SSD controller 3210 may perform a recovery operation based on a largest value of dump ages corresponding to the dump data stored in the recovery area, and the value of a meta-age corresponding to the most recently stored metadata. The dump age may indicate the number of times that data has been dumped to the recovery area, and the meta-age may be a value corresponding to the dump age in which the recovery operation is performed.

For example, when the largest value of dump ages (corresponding to the dump data stored in the recovery area) is not equal to the value of the meta-age corresponding to the most recently stored metadata, it may be determined that the recovery operation has not been performed. Therefore, the SSD controller 3210 may perform a recovery operation based on the dump data stored in the recovery area.

When the largest value of dump ages (corresponding to the dump data stored in the recovery area) is equal to the value of the meta-age corresponding to the most recently stored metadata, it may be determined that the recovery operation has been performed. Therefore, SSD controller 3210 may perform a recovery operation regardless of (e.g., without regard to) the dump data stored in the recovery area.

Figure 15:
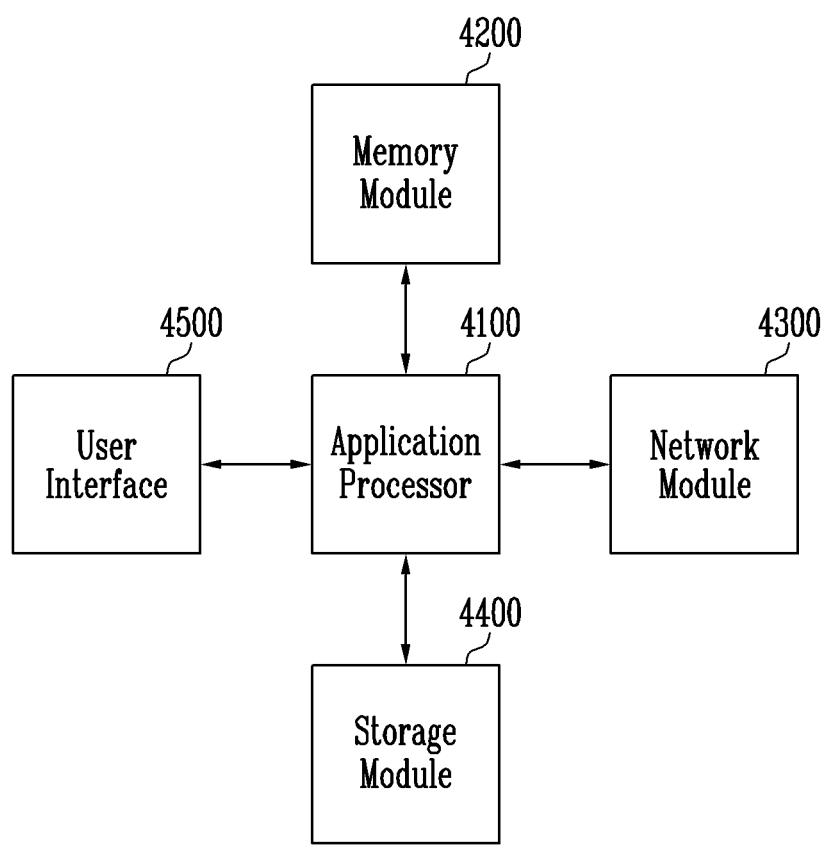
FIG. 15 illustrates an embodiment of a user system.

FIG. 15 is a block diagram illustrating an embodiment of a user system 4000, to which a storage device according to any of the embodiments described herein may be applied.

Referring to FIG. 15, the user system 4000 may include an application processor 4100, a memory module 4200, a network module 4300, a storage module 4400, and a user interface 4500. The application processor 4100 may run components in the user system 4000, an Operating System (OS), and/or a user program. In an embodiment, the application processor 4100 may include controllers, interfaces, graphic engines, and/or other features to control components in the user system 4000. In one embodiment, the application processor 4100 may be provided as a system-on-chip (SoC).

The memory module 4200 may function as a main memory, a working memory, a buffer memory or a cache memory of the user system 4000. The memory module 4200 may include one or more volatile RAMs (e.g., DRAM, SDRAM, DDR SDRAM, DDR2 SDRAM, DDR3 SDRAM, LPDDR SDRAM, LPDDR2 SDRAM, and LPDDR3 SDRAM) or one or more nonvolatile RAMs (e.g., PRAM, RRAM, MRAM, FRAM). In an embodiment, the application processor 4100 and the memory module 4200 may be packaged, for example, as package-on-package (POP) and in this case may be provided as a single semiconductor package.

The network module 4300 may communicate with external devices. For example, the network module 4300 may support wireless communications. Examples include Code Division Multiple Access (CDMA), Global System for Mobile communication (GSM), wideband CDMA (WCDMA), CDMA-2000, Time Division Multiple Access (TDMA), Long Term Evolution (LTE), WiMAX, WLAN, UWB, Bluetooth, and Wi-Fi communication. In an embodiment, network module 4300 may be in application processor 4100.

The storage module 4400 may store data, for example, received from the application processor 4100. In one embodiment, the storage module 4400 may transmit the data stored in the storage module 4400 to the application processor 4100. In an embodiment, the storage module 4400 may be implemented as a nonvolatile semiconductor memory device. Examples include a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may include a removable storage medium (e.g., a removable drive) such as a memory card or an external drive of the user system 4000.

In an embodiment, the storage module 4400 may include a plurality of nonvolatile memory devices, each of which may be operated, for example, in the same way as the memory device described with reference to FIGS. 2 and 3. The storage module 4400 may be operated, for example, in the same way as storage device 50 of FIG. 1.

The user interface 4500 may include one or more interfaces which input data or instructions to the application processor 4100 and/or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, and a monitor.

In an embodiment, when a sudden power-off (SPO) occurs while the storage module 4400 is performing a program operation, the application processor 4100 may control operations subsequent to the SPO. For example, when an SPO is detected, data stored in the memory module 4200 may be programmed to the storage module 4400 in a force unit access mode (FUA MODE), after which power may be turned off. In an embodiment, data stored in the memory module 4200 may be dumped to a recovery area in the application processor 4100 and then be stored in the storage module 4400, after which power may be turned off.

In one case, an SPO may occur after charging of one or more capacitors in an auxiliary power supply in the application processor 4100 has been completed. In another case, an SPO may occur while discharging or charging of the one or more capacitors is being performed.

When charging of the one or more capacitors is not completed, the auxiliary power supply may not supply assistant power. In this case, after the application processor 4100 may program the data stored in the memory module 4200 in the FUA mode, power may be turned off.

However, when charging of the one or more capacitors is completed, the auxiliary power supply may supply assistant power. Therefore, in this case, the application processor 4100 may dump the data stored in the memory module 4200 to the recovery area using the assistant power, and the dump data (dumped to the recovery area) may be stored in storage module 4400.

Thereafter, when power is turned on and an SPO recovery operation is performed, the application processor 4100 may perform a recovery operation based on a largest value of dump ages corresponding to the dump data stored in the recovery area, and the value of a meta-age corresponding to the most recently stored metadata. The dump age may indicate the number of times that data is dumped to the recovery area, and the meta-age may be a value corresponding to the dump age in which the recovery operation is performed.

When, for example, the largest value of dump ages (corresponding to the dump data stored in the recovery area) is not equal to the value of the meta-age corresponding to the most recently stored metadata, it may be determined that the recovery operation has not been performed. Therefore, the application processor 4100 may perform a recovery operation based on the dump data stored in the recovery area.

When the largest value of dump ages (corresponding to the dump data stored in the recovery area) is equal to the value of the meta-age corresponding to the most recently stored metadata, it may be determined that the recovery operation has been performed. Therefore, the application processor 4100 may perform a recovery operation regardless of (e.g., without regard to) the dump data stored in the recovery area.

In accordance with one or more embodiments, when a sudden power-off occurs and when an index of a recovery area matches an index of a meta-area, a recovery operation is performed without referring to data in the recovery area. The indices may include, for example, correspond to dump ages as previously described. When indices thereof do not match each other, a recovery operation is performed by referring to data in the recovery area, thus preventing data reliability from being deteriorated due to the occurrence of a sudden power-off.

In accordance with one embodiment, an apparatus includes a storage area configured to store instructions and a controller configured to execute the instructions. The storage area may be included in a non-transitory computer-readable medium (e.g., memory module 420 or another instruction storage area in a volatile or nonvolatile memory area), and the controller may correspond to any of the embodiments of the controllers described herein.

When the instructions are executed, the controller may store dump data and information indicative of a dump age in a recovery area based on detection of a sudden power-off. The dump data may correspond to data stored in a memory buffer, and the recovery area may be within the controller or in a device coupled to the controller, e.g., the power loss controller 230 or another controller. The controller may perform a recovery operation based on the information indicative of the dump age. The dump age may correspond to any of the embodiments described here, e.g., may indicate a number of times that different items of host data corresponding to the dump data has been dumped, either with respect to the same SPO occurrence or different SPO occurrences.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

When implemented in at least partially in software, the controllers, processors, devices, managers, components, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. The embodiments may be combined to form additional embodiments.

What is claimed is:

1. A memory controller, comprising:
   a memory buffer configured to store host data output from a host;
   a sudden power-off (SPO) detector configured to output a detection signal when a sudden power-off is detected; and
   a power loss controller configured to:
   based on the detection signal, receive dump data corresponding to the host data from the memory buffer, and output the dump data and a dump age to a memory device; and
   when a power is turned on after the sudden power-off, receive the dump data and the dump age from the memory device, and control a recovery operation based on the dump age and a meta age,
   wherein the dump age indicates a number of times that different items of host data have been dumped from the memory buffer to the power loss controller, and
   wherein the meta age indicates a dump age corresponding to dump data used for a most recently completed recovery operation.

2. The memory controller according to claim 1, wherein:
   the power loss controller comprises an auxiliary power supply configured to supply assistant power in an event of the sudden power-off; and
   the auxiliary power supply includes one or more capacitors.

3. The memory controller according to claim 2, wherein:
   when charging of the one or more capacitors is delayed or has not been completed in the event of the sudden power-off, the memory buffer is configured to output the host data to be programmed in the memory device.

4. The memory controller according to claim 2, wherein:
   when charging of the one or more capacitors is completed in the event of the sudden power-off, the memory buffer is configured to dump the host data to the power loss controller.

5. The memory controller according to claim 1, wherein the power loss controller comprises a recovery controller configured to,
   when the power is turned on after the sudden power-off, receive two or more items of dump data stored in the memory device and dump ages respectively corresponding to the two or more items of dump data.

6. The memory controller according to claim 5, wherein the recovery controller is configured to control the recovery operation based on dump data corresponding to a largest dump age among the dump ages.

7. The memory controller according to claim 6, wherein:
   when the recovery operation is completed based on the dump data corresponding to the largest dump age, the recovery controller is configured to store the largest dump age in a meta area as the meta age.

8. The memory controller according to claim 7, wherein, when the power is turned on after the meta age has been stored in the meta area and an additional sudden power-off occurs, the power loss controller is configured to:
   receive the two or more items of dump data stored in the memory device and the dump ages respectively corresponding to the two or more items of dump data; and
   control the recovery operation based on the dump ages and the meta age.

9. The memory controller according to claim 8, wherein the recovery controller is configured to control the recovery operation based on the dump data corresponding to the largest dump age of the dump ages.

10. The memory controller according to claim 8, wherein:
    when the largest dump age equals the meta age, the recovery controller is configured to perform the recovery operation regardless of the dump data.

11. The memory controller according to claim 8, wherein:
    when the largest dump age is different from the meta age, the recovery controller is configured to perform the recovery operation based on the dump data.

12. An apparatus comprising:
    a memory device; and
    a memory controller configured to control the memory device to:
    store dump data and a dump age in a recovery area of the memory device based on detection of a sudden power-off, the dump data corresponding to host data temporarily stored in a memory buffer of the memory controller; and
    perform a recovery operation based on a result of comparing the dump age and a meta age,
    wherein the dump age indicates a number of times that different items of host data corresponding to the dump data have been dumped, and
    wherein the meta age indicates a dump age corresponding to dump data used for a most recently completed recovery operation.

13. A method of operating a memory controller, the method comprising:
    storing host data, from a host, in a memory buffer;
    when a sudden power-off is detected, storing dump data and a dump age corresponding to the dump data, the dump data corresponding to the host data stored in the memory buffer;
    determining whether the host data is to be dumped to a memory device;
    outputting the dump data and the dump age to the memory device;

when a power is turned on after the sudden power-off, receiving the dump data and the dump age from the memory device; and performing a recovery operation based on the dump age and a meta age, wherein the dump age indicates a number of times that different items of host data have been dumped as the dump data, and wherein the meta age indicates a dump age corresponding to dump data used for a most recently completed recovery operation.

14. The method according to claim 13, wherein:

determining whether the host data is to be dumped to the memory device is performed based on a charging state of one or more capacitors in an auxiliary power supply, and the auxiliary power supply is configured to supply assistant power in an event of the sudden power-off.

15. The method according to claim 14, wherein:

determining whether the host data is to be dumped to the memory device includes determining whether charging of the one or more capacitors has been completed when the sudden power-off is detected.

16. The method according to claim 13, wherein:

performing the recovery operation comprises receiving the dump data and the dump age from the memory device, and when two or more items of dump data and dump ages respectively corresponding to the two or more items of dump data are received from the memory device, the recovery operation is configured to be performed based on dump data corresponding to a largest dump age of the dump ages.

17. The method according to claim 16, wherein performing the recovery operation includes:

when the recovery operation is completed based on the dump data corresponding to the largest dump age, storing a meta age corresponding to the largest dump age in a meta area.

18. The method according to claim 17, wherein performing the recovery operation includes:

when an additional sudden power-off occurs after the meta age has been stored in the meta area, performing the recovery operation based on the dump ages received from the memory device and the meta age received from the meta area.

19. The method according to claim 18, wherein performing the recovery operation includes:

when the largest dump age is equal to the meta age, performing the recovery operation regardless of the dump data.

20. The method according to claim 19, wherein performing the recovery operation includes:

when the largest dump age is different from the meta age, performing the recovery operation based on the dump data.

* * * * *